(12) United States Patent
Okimitsu

(10) Patent No.: US 11,841,501 B2
(45) Date of Patent: Dec. 12, 2023

(54) ARITHMETIC APPARATUS, ARITHMETIC METHOD, AND STORAGE MEDIUM

(71) Applicant: HONDA MOTOR CO., LTD., Tokyo (JP)

(72) Inventor: Takeomi Okimitsu, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 384 days.

(21) Appl. No.: 17/395,436

(22) Filed: Aug. 5, 2021

(65) Prior Publication Data

US 2021/0365597 A1  Nov. 25, 2021

Related U.S. Application Data

(63) Continuation of application No. PCT/JP2020/004625, filed on Feb. 6, 2020.

(30) Foreign Application Priority Data

Feb. 7, 2019  (JP) ................. 2019-020484

(51) Int. Cl.
| | | |
|---|---|---|
| G02B 27/00 | (2006.01) | |
| G06F 30/10 | (2020.01) | |
| G06F 111/10 | (2020.01) | |
| F21V 8/00 | (2006.01) | |
| F21S 41/24 | (2018.01) | |

(52) U.S. Cl.
CPC .......... *G02B 27/0012* (2013.01); *F21S 41/24* (2018.01); *G02B 6/0011* (2013.01); *G06F 30/10* (2020.01); *G06F 2111/10* (2020.01)

(58) Field of Classification Search
CPC ... G02B 27/0012; G02B 6/0011; G06F 30/10; G06F 2111/10; F21S 41/24
See application file for complete search history.

(56) References Cited

U.S. PATENT DOCUMENTS

| | | |
|---|---|---|
| 2010/0302802 A1 | 12/2010 | Bita |
| 2012/0106127 A1 | 5/2012 | Hattori |

(Continued)

FOREIGN PATENT DOCUMENTS

| | | |
|---|---|---|
| JP | 2000193827 A | 7/2000 |
| JP | 2003121654 A | 4/2003 |
| JP | 2007507815 A | 3/2007 |

(Continued)

OTHER PUBLICATIONS

Office Action issued for counterpart Japanese Application No. 2020-571264, issued by the Japanese Patent Office dated Oct. 18, 2022 (drafted on Oct. 11, 2022).

(Continued)

*Primary Examiner* — Chuen-Meei Gan

(57) ABSTRACT

An arithmetic apparatus according to the present embodiment sets setting values with respect to two among a light guide distance of a light guide body, an input light amount to a light incident surface and an output light amount on a light-emitting surface, and calculates remaining one value among the light guide distance, the input light amount and the output light amount by applying the set setting values to a calculation equation indicative of a balance of a light amount of light that is guided by a unit distance in the light guide body.

19 Claims, 13 Drawing Sheets

(56) References Cited

U.S. PATENT DOCUMENTS

2019/0049088 A1* 2/2019 Sakashita .............. G02B 6/002
2019/0317313 A1* 10/2019 Oki .................... G03B 21/2033

FOREIGN PATENT DOCUMENTS

| JP | 2007242336 A | | 9/2007 | | |
| --- | --- | --- | --- | --- | --- |
| JP | 2010067442 A | | 3/2010 | | |
| JP | 2012528361 A | | 11/2012 | | |
| JP | 2017-153558 A | * | 2/2016 | .............. | A61B 1/06 |
| KR | 100413541 B1 | | 12/2003 | | |

OTHER PUBLICATIONS

Extended European Search Report for counterpart European Application No. 20753102.1, issued by the European Patent Office dated Oct. 20, 2022.

Tejido Juan Manuel, Conception and design of illumination light pipes, Feb. 29, 2000 (Feb. 29, 2000), pp. 1-152, XP055970391, Retrieved from the Internet URL:https://www.researchgate.net/profile/Juan Teijido/publication/33681746_Conception_and_design_of_illumination_light_pipes/links/5770b89d08ae10de639c0e8e/Conception-and-design-of-illumination-light pipes.pdf (retrieved on Oct. 12, 2022].

Chirarattananon S et al, Simulation of Transmission of Daylight through Cylindrical Light Pipes, Journal of Sustainable Energy & Environment Copyright By Journal of Sustainable Energy and Environment, Jan. 1, 2010 (Jan. 1, 2010), pp. 97-103, XP055970397, Retrieved from the Internet:URL:https://www.jseejournal.com/media/62/attachment/Simulation%20of%20p%2097-103.pdf [retrieved on Oct. 12, 2022].

International Preliminary Report on Patentability for International Application No. PCT/JP2020/004625, issued by the International Bureau of WIPO dated Aug. 10, 2021.

\* cited by examiner

CALCULATION ITEM                                                                    6

○ MAXIMUM LIGHT      ○ REQUIRED INPUT      ● CRITICAL EVEN
  GUIDE DISTANCE       LUMINOUS FLUX         BRIGHTNESS

ABSORPTION COEFFICIENT (a)

● ACRYLIC RESIN      ○ POLYCARBONATE RESIN

○ ARBITRARY INPUT    [          ]

LIGHT GUIDE WIDTH (X)            [          ]  [mm]

INPUT LUMINOUS FLUX (F)          [          ]  [lm]

EVEN BRIGHTNESS (L)              [          ]  [cd/m²]

LIGHT GUIDE DISTANCE ($Y_{max}$) [          ]  [mm]

ENTIRE AVERAGE
LIGHT INTENSITY (Ia)             [          ]  [cd]

CENTRAL MAXIMUM LIGHT
INTENSITY (Ian)                  [          ]  [cd]

ABSORPTION LOSS ($I_{loss}$)     [          ]  [cd]

LUMINOUS EFFICIENCY ($\eta_{max}$) [        ]  [%]

*FIG. 3*

ARITHMETIC APPARATUS, ARITHMETIC METHOD, AND STORAGE MEDIUM

The contents of the following Japanese patent applications are incorporated herein by reference:
NO. 2019-020484 filed in JP on Feb. 7, 2019, and
NO. PCT/JP2020/004625 filed in WO on Feb. 6, 2020.

BACKGROUND

1. Technical Field

The present invention relates to an arithmetic apparatus, a method and a storage medium.

2. Related Art

A light guide body (also referred to as 'light guide') that is mounted on a motorcycle and the like is usually designed according to following procedures. 1) Design requirements such as a shape of a light guide body, an intensity of a light source, required brightness (a brightness value and a level of evenness), a regulation light distribution and the like that are necessarily required from practical standpoints are set. 2) Design conditions such as a material of the light guide body, a structure of a prism (a shape, a size, an arrangement pitch, and the like), a structure of a light incident part and the like that can be arbitrarily selected are set. 3) As for the requirements and conditions, a light beam tracing is executed using optical analysis software so as to analyze brightness on a light-emitting surface. As used herein, the light beam tracing is meant to trace a locus of a light beam after a light beam ejected from a light source and input into the light guide body via a light incident surface is guided in the light guide body until the light beam is emitted from the light-emitting surface (for example, refer to Patent Documents 1 and 2). 4) The design conditions are modified so that the brightness on the light-emitting surface falls within a target range determined depending on the requirements, and the brightness analysis of the above 3) is repeated (for example, refer to Patent Document 3).

Patent Document 1: Japanese Patent Application Publication No. 2003-121654
Patent Document 2: Japanese Patent Application Publication No. 2007-507815
Patent Document 3: Japanese Patent Application Publication No. 2012-528361

However, according to the above empirical design method, in the early stage of design, it is uncertain whether the requirement of the above 1), particularly, the required brightness can be achieved. Therefore, in some cases, it is turned out that the requirements cannot be achieved, only after the design procedures from the above 2) to the above 4), and further, the trial production of the light guide body is repeated. As a result, the requirements should be reset and the design should be redone. Such rework increases man-hours. Therefore, in the early stage of design, it is needed to make a prospect for the design of the light guide body by obtaining theoretical limitation of the requirement of 1) by using a theoretical model phenomenologically incorporating a particularly dominant effect among physical effects received by the light beam guided in the light guide body.

GENERAL DISCLOSURE

An arithmetic apparatus configured to perform a design computing for a light guide body configured to guide light input from a light incident surface to a light-emitting surface different from the light incident surface and to output the light from the light-emitting surface may comprise a setting unit configured to set setting values with respect to two among a light guide distance of the light guide body, an input light amount to the light incident surface and an output light amount on the light-emitting surface. The arithmetic apparatus may comprise a calculation unit configured to calculate remaining one value among the light guide distance, the input light amount and the output light amount by applying the setting values set by the setting unit to a calculation equation indicative of a balance of a light amount of light that is guided by a unit distance in the light guide body. The calculation unit may be configured to calculate the remaining one value by repeatedly calculating an absorption light amount to be absorbed by the light guide body and a light amount to be output from a unit surface on the light-emitting surface corresponding to a unit distance using the calculation equation and calculating a remaining intensity value by subtracting calculation values of the absorption light amount and the light amount from an intensity value of the light each time the light advances by the unit distance in the light guide body, until the remaining intensity value is exhausted. The setting unit may be configured to further set an absorption coefficient of the light guide body. The calculation unit may be configured to calculate the absorption light amount of the light to be absorbed by the light guide body by using the absorption coefficient. The calculation unit may be configured to calculate the absorption light amount of the light, further based on spread of the light advancing in the light guide body. The calculation unit may be configured to calculate the light amount to be output from the unit surface on the light-emitting surface, based on the setting value of the output light amount. The setting unit may be configured to further set a width of the light guide body. The calculation unit may be configured to calculate the light amount by using the setting value of the width. The setting unit may be configured to set each value of the input light amount and the output light amount. The calculation unit may be configured to calculate the light guide distance by using the setting values of the input light amount and the output light amount. The setting unit may be configured to set each value of the light guide distance and the input light amount. The calculation unit may be configured to calculate the light guide distance by using the setting value of the input light amount and by repeatedly changing the value of the output light amount, and to calculate the output light amount becoming a maximum output light amount so that the calculated value is to be equal to the setting value of the light guide distance. The setting unit may be configured to set each value of the light guide distance and the output light amount. The calculation unit may be configured to calculate the input light amount by using the setting values of the light guide distance and the output light amount. The arithmetic apparatus may further determine at least one of an absorption loss and a luminous efficiency of light.

An arithmetic method of performing a design computing for a light guide body configured to guide light input from a light incident surface to a light-emitting surface different from the light incident surface and to output the light from the light-emitting surface may comprise a step of setting values with respect to two among a light guide distance of the light guide body, an input light amount to the light incident surface and an output light amount on the light-emitting surface. The arithmetic method may comprise a step of calculating remaining one value among the light guide distance, the input light amount and the output light amount by applying the setting values set in the setting step to a calculation equation indicative of a balance of a light amount of light that is guided by a unit distance in the light guide body.

A program stored on a storage medium may be configured to cause a computer to execute a process of setting values with respect to two among a light guide distance of a light guide body configured to guide light input from a light incident surface to a light-emitting surface different from the light incident surface and to output the light from the light-emitting surface, an input light amount to the light incident surface and an output light amount on the light-emitting surface. The program stored on the storage medium may be configured to cause the computer to execute a process of calculating remaining one value among the light guide distance, the input light amount and the output light amount by applying the setting values set in the setting process to a calculation equation indicative of a balance of a light amount of light that is guided by a unit distance in the light guide body.

The summary clause does not necessarily describe all necessary features of the embodiments of the present invention. The present invention may also be a sub-combination of the features described above.

BRIEF DESCRIPTION OF THE DRAWINGS

FIG. 3 shows an input/output screen of the design support device according to the first embodiment.

DESCRIPTION OF EXEMPLARY EMBODIMENTS

Hereinafter, the present invention will be described through embodiments of the invention. However, the following embodiments do not limit the invention defined in the claims. Also, all combinations of features described in the embodiments are not necessarily essential to solutions of the invention.

First Embodiment

Figure 1:
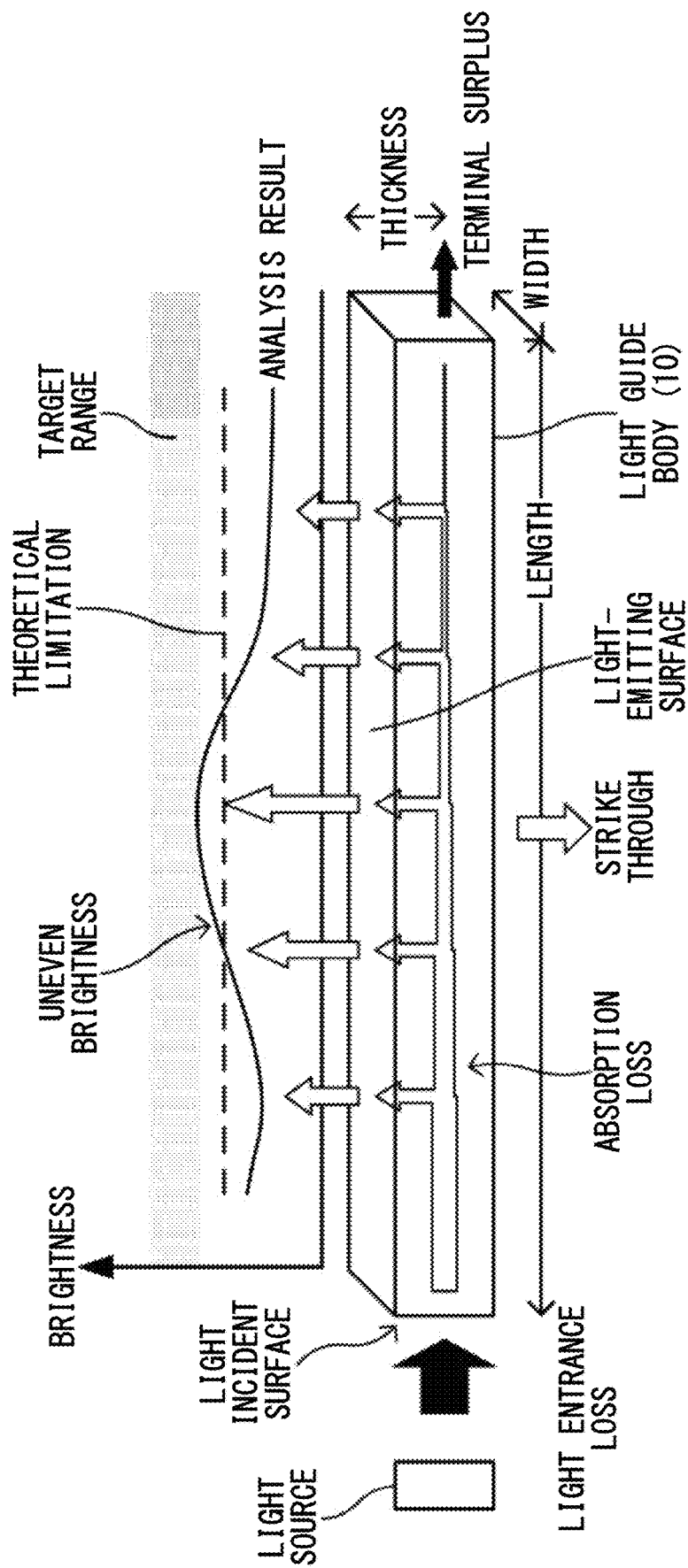
FIG. 1 shows an example of a configuration of a light guide body, and a relationship between losses of luminous fluxes guided in the light guide body and brightness on a light-emitting surface.

FIG. 1 shows an example of a configuration of a light guide body that is a design target. The light guide body is an optical component configured to guide a luminous flux input from a light incident surface to a light-emitting surface different from the light incident surface and to output the luminous flux from the light-emitting surface. As an example, the light guide body is formed into a prismatic column shape having a length, a width and a thickness by using resin such as acrylic resin, polycarbonate resin or the like. A plurality of prisms (not shown) is aligned on a bottom surface of the light guide body, a left end face of the light guide body functions as a light incident surface onto which a luminous flux emitted from a light source is input, and an upper surface functions as a light-emitting surface from which the luminous flux is output. Note that, the light source may include one or more LEDs. In FIG. 1 and other drawings, a direction in which (a central axis of) the light guide body extends and the luminous flux is guided is referred to as a light guide direction, a direction in which the upper surface (light-emitting surface) and the bottom surface face each other is referred to as a thickness direction, and a direction orthogonal to each of the light guide direction and the thickness direction is referred to as a width direction.

In the light guide body configured as described above, the luminous flux input from the light incident surface is spread in the light guide body and guided rightward while being reflected on the upper, side and bottom surfaces, is directed upward by the prisms on the bottom surface, and is output from the light-emitting surface. In this way, light is emitted from the light-emitting surface. At this time, the luminous flux is reflected on the light incident surface, is absorbed by a material of the light guide body, penetrates the side and bottom surfaces without being reflected thereon, and is further output from the light guide body through a right end face (also referred to as 'terminal face'), so that losses of the luminous flux are caused. These losses are each referred to as a light entrance loss, an absorption loss, strike through, and a terminal surplus. In addition, a distribution of amounts (also referred to as 'light intensity') of the luminous flux that is output on the light-emitting surface changes due to a structure (a shape, a size, an arrangement pitch and the like) of the prisms, so that brightness on the light-emitting surface becomes uneven.

In designing the light guide body, design conditions are modified so that the brightness on the light-emitting surface falls within a target range given as a design requirement. However, even when the brightness on the light-emitting surface is analyzed by performing light beam tracing by optical analysis software, it cannot be known from which design conditions a result thereof is derived. Therefore, it is usual to empirically improve the design conditions. In a design support device and a design support method according to a first embodiment, in order to make a prospect for a design of the light guide body, a theoretical model phenomenologically incorporating a particularly dominant effect among physical effects (particularly, the above losses) received by the light beam guided in the light guide body is established, and theoretical limitations of design requirements and conditions are obtained by using the theoretical model.

In the first embodiment, it is assumed that the following assumptions are adopted so as to obtain theoretical limitations of design requirements and conditions for the light guide body. 1) All the luminous fluxes that are emitted from the light source are input into the light guide body via the light incident surface. That is, an input loss is zero. 2) The brightness on the light-emitting surface is even. That is, Lambertian light emission occurs and there is no strike through. 3) The luminous flux is consumed without reaching the terminal face. That is, there is no terminal surplus. Specifically, the minimum phenomenological model incorporating only the absorption loss, which is inevitable and most dominant, among the losses is adopted. By using the phenomenological model, the theoretical limitations of design requirements and conditions are obtained, in a case where the luminous flux input in the light guide body is guided rightward while being absorbed by the light guide body and is then output from the light-emitting surface, so that light is emitted from the light-emitting surface at even brightness.

A design support device 10 according to the first embodiment is a computer device such as a personal computer, and includes at least a central processing unit (CPU (refer to FIG. 13)). The CPU is configured to cause the design support device 10 to exhibit a function of executing an analysis method of the light guide body by executing a design program. The design program is stored, for example, in a ROM and is read out by the CPU or is stored in a storage medium such as a DVD-ROM and is read out by the CPU using a reading device such as a DVD-ROM drive, and is developed into a RAM to be activated. Note that, the hardware configuration of the computer device will be described in more detail later with reference to an example.

Figure 2:
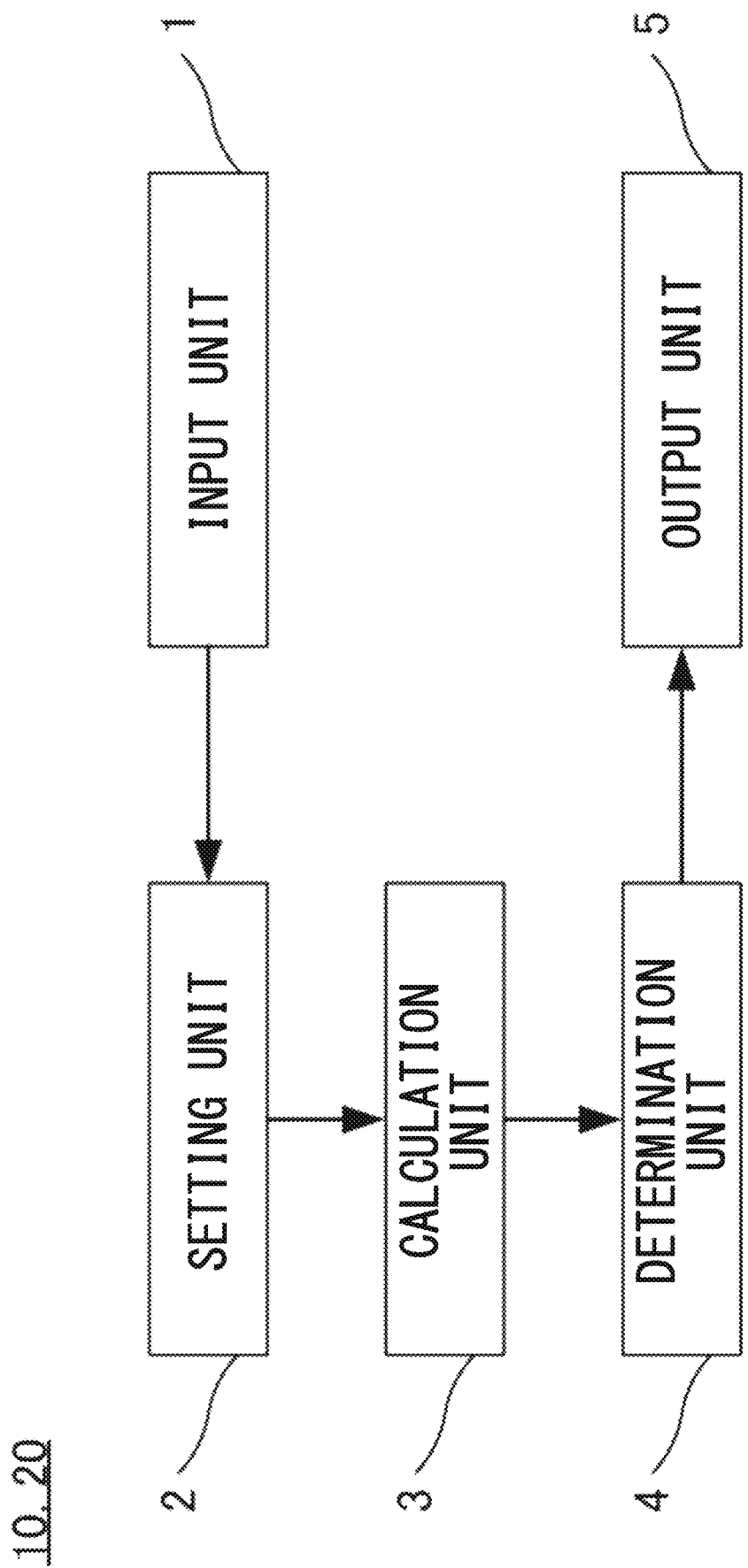
FIG. 2 shows a functional configuration of a design support device according to a first embodiment.

FIG. 2 shows a functional configuration of the design support device 10. The design support device 10 comprises an input unit 1, a setting unit 2, a calculation unit 3, a determination unit 4, and an output unit 5. Note that, in the first embodiment, as the design requirements and conditions, a width (referred to as 'light guide width') and a light guide distance of the light guide body corresponding to a shape of the light guide body, an input luminous flux (an example of the input light amount; the input light amount is not limited to the luminous flux and may also be expressed by a light intensity, a brightness and any concept indicative of the light amount) corresponding to an intensity of the light source, an even brightness corresponding to the required brightness (an example of the output light amount; the output light amount is not limited to the brightness and may also be expressed by a light intensity, a luminous flux, and any concept indicative of the light amount), and an absorption coefficient of a material of the light guide body are treated.

The input unit 1 is a unit configured to receive input information that is input via an input device such as a keyboard by a user. The input information is transmitted to the setting unit 2.

FIG. 3 shows the input/output screen 6 of the design support device 10. The input information includes selection of a calculation item from the maximum light guide distance, the required input luminous flux and the critical even brightness, selection of a material of the light guide body or the absorption coefficient a of the material, the light guide width X, and two remaining items excluding an item corresponding to a selection item from the input luminous flux F, the even brightness L, and the light guide distance $Y_{max}$. As the material of the light guide body, acrylic resin and polycarbonate resin are displayed as the selection item. In the present example, the critical even brightness is selected as the calculation item, acrylic resin is selected as the material of the light guide body, and values of the light guide width, the input luminous flux and the light guide distance are input by the user. Note that, the entire average light intensity Ia is an average light intensity ($dIXY_{max}$) of the entire light-receiving surface, and the central maximum light intensity Ian is a central light intensity of the light-receiving surface, i.e., the maximum light intensity (2Ia, assuming Lambertian light emission).

The setting unit 2 is a unit configured to set the design requirements and conditions for the light guide body. The setting unit 2 is configured to set a value of the absorption coefficient a of the material of the light guide body, a value of the light guide width X, and two remaining items excluding a calculation item from the input luminous flux F, the even brightness L, and the light guide distance $Y_{max}$, according to the input information transmitted from the input unit 1. Note that, as for the value of the absorption coefficient, when a material of the light guide body is selected, a value determined from the material is set. The values of the absorption coefficients determined from each of materials may also be stored in advance in a memory or the like. In addition, when the value is arbitrarily input, the input value is set. When the maximum light guide distance is selected as the calculation item, the setting unit 2 sets each value of the input luminous flux and the even brightness, according to the input information, when the required input luminous flux is selected, the setting unit 2 sets each value of the light guide distance and the input luminous flux, and when the critical even brightness is selected, the setting unit 2 sets each value of the light guide distance and the even brightness. In the example of FIG. 3, a value of the absorption coefficient determined from the selected acrylic resin, and a value of the light guide width, a value of the input luminous flux and a value of the light guide distance are set from the input information input by the user. These setting values are transmitted to the calculation unit 3.

The calculation unit 3 is a unit configured to calculate an item, which corresponds to the selection item, among the light guide distance, the input luminous flux and the even brightness by applying the setting values set by the setting unit 2 to a calculation equation. As described later, the calculation equation indicates that a light amount of light advancing in the light guide body by a unit distance is equal to an amount obtained by subtracting, from a light amount before light advances by the unit distance, an absorption light amount to be absorbed by the light guide body and a light amount to be output from the light-emitting surface as light advances by the unit distance.

Figure 4:
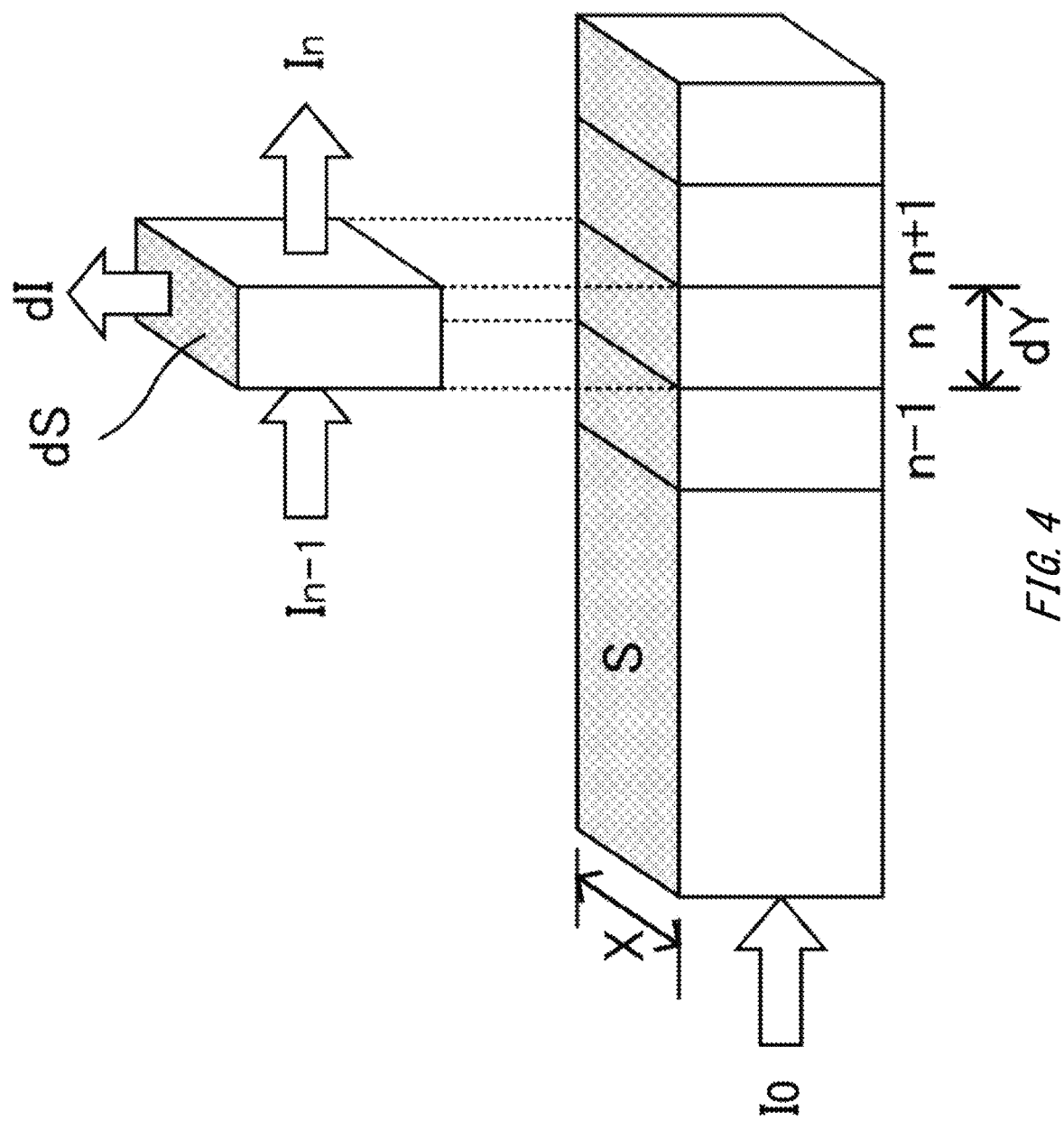
FIG. 4 shows an absorption loss and a light emission loss of the luminous flux based on a periodic model.

FIG. 4 shows a periodic model that is adopted in the first embodiment. In the periodic model, a balance of the luminous flux that is guided in the light guide body by a repeating unit distance dY [mm] can be expressed by the following equation.

[Formula 1]

$$I_n = I_{n-1} e^{-adYc} - dI \cdot X \qquad (1)$$

Here, $I_n$ and $I_{n-1}$ are each amounts of the luminous flux, i.e., the light intensity [cd] after and before the luminous flux is guided by the unit distance dY in an $n^{th}$ time, a is the absorption coefficient [mm$^{-1}$], c is the correction coefficient resulting from spread of the luminous flux, and dI·X is the light intensity that is output from the unit surface dS=dYX [mm$^2$] on the light-emitting surface corresponding to the unit distance dY. The first item on the right side indicates the remaining light intensity including the absorption loss $I_{loss}=I_{n-1}(1-e^{-adYc})$ of the luminous flux, i.e., obtained by subtracting the absorption light amount that is absorbed by the light guide body when the luminous flux is guided by the unit distance dY in the light guide body. The second item on the right side indicates the output light amount (light emission amount) of the luminous flux from the light-emitting surface, i.e., the light intensity that is output from the unit surface dS on the light-emitting surface when the luminous flux is guided by the unit distance dY in the light guide body.

Therefore, the above equation indicates that the light intensity $I_n$ after the luminous flux is guided by the unit distance dY in the light guide body in the $n^{th}$ time is equal to the light intensity obtained by subtracting the absorption light amount and the light intensity to be output from the light intensity $I_{n-1}$ before the guide.

The equation (1) can be solved as follows, for example.

[Formula 2]

$$I_1 = I_0 e^{-adYc} - dI \cdot X \quad (2)$$
$$I_2 = I_1 e^{-adYc} - dI \cdot X$$
$$\vdots$$
$$I_n = I_{n-1} e^{-adYc} - dI \cdot X$$

In the first equation, the calculation unit 3 calculates the absorption loss $I_{loss}$ of the luminous flux absorbed by the light guide body and the light emission intensity dI·X output from the unit surface dS(=dYX) on the light-emitting surface when the luminous flux advances by the unit distance dY in the light guide body, with respect to the input light intensity $I_0(=F/2\pi)$, and calculates the remaining light intensity $I_1$ by subtracting the calculation values thereof from the light intensity $I_0$. Here, the absorption loss $I_{loss}$ of the luminous flux is calculated using the setting value of the absorption coefficient a. The light emission intensity dI is calculated using the setting value of the even brightness L and the setting value of the light guide width X.

In the second equation, the calculation unit 3 calculates the absorption loss $I_{loss}$ of the luminous flux and the light emission intensity dI·X at a time when the luminous flux further advances by the unit distance dY in the light guide body, with respect to the light intensity $I_1$ calculated in the first equation, and calculates the remaining light intensity $I_2$ by subtracting the calculation values thereof from the light intensity $I_1$.

The calculation unit 3 repeats the calculations until the remaining light intensity $I_n$ is exhausted but until a condition of dI·X≥$I_n$≥0 is satisfied in the numerical calculation. Specifically, the calculation unit 3 repeatedly calculates the absorption loss $I_{loss}$ of the luminous flux and the light emission intensity dI·X and calculates the remaining light intensity $I_n$ by subtracting the calculation values thereof from the light intensity $I_{n-1}$ each time the luminous flux advances by the unit distance dY in the light guide body, with respect to the input light intensity $I_0$, until the remaining light intensity $I_n$ is exhausted. By using the number of repeating times n, the light guide distance dYn is calculated.

The calculation unit 3 may also be configured to calculate the absorption loss of the luminous flux by using the correction coefficient c, based on the spread of the luminous flux advancing in the light guide body. The luminous flux that is input from the light incident surface of the light guide body has a spread of about 84° with respect to the acrylic resin, for example. For this reason, the light beam that is guided on a central axis of the light guide body and the light beam that is guided in a direction inclined from the central axis differ in an advancing distance in the light guide body when guided on the central axis by the unit distance dY, and the absorption light amounts of the light beams also differ. Therefore, the correction coefficient c may be determined based on the spread of the light beam, resulting in a one-dimensional model in which the luminous flux advances along the central axis in the light guide body. For example, c=∫φ(θ)sec(θ)dθ may be determined using a spread distribution φ(θ)=$I_0$(θ)/∫$I_0$(θ)dθ of the input luminous flux. By using the correction coefficient c, an average advancing distance dYc of the luminous flux that advances with being spread in the light guide body is obtained. In the equation (2), the light guide distance dYn may be calculated with respect to the angle θ by using $I_0$φ(θ) instead of the input light intensity $I_0$ and the correction coefficient c=sec(θ), and a result thereof may be averaged with respect to the angle θ to calculate the light guide distance.

In a case where the maximum light guide distance is selected as the calculation item, the calculation unit 3 calculates the light guide distance dYn according to the equation (2) by using the setting values of the input light intensity $I_0(=F/2\pi)$ and the even brightness L.

In a case where the required input luminous flux is selected as the calculation item, the calculation unit 3 calculates dI·X by using the setting value of the even brightness L, calculates n=$Y_{max}$/dY by using the setting value of the light guide distance $Y_{max}$, and calculates the input light intensity $I_0$ by substituting these values into the equation 1. At this time, the equation 1 is modified as follows.

[Formula 3]

$$I_{n-1} = I_n e^{adYc} + dI \cdot X \quad (3)$$

Here, the first item on the right side indicates the light intensity obtained by adding the absorption light amount, which is absorbed by the light guide body at a time when the luminous flux is guided in the final $n^{th}$ time, to the remaining light intensity after the luminous flux is guided n times by the unit distance dY in the light guide body. The second item on the right side indicates the light intensity that is output from the unit surface dS on the light-emitting surface when the luminous flux is guided by the unit distance dY in the light guide body. Therefore, the above equation indicates that the light intensity $I_{n-1}$ before the luminous flux is guided by the unit distance dY in the light guide body in the $n^{th}$ time is equal to as the light intensity obtained by adding the absorption light amount and the output light intensity to the light intensity $I_n$ after guided.

The calculation unit 3 solves the equation (3) by using In=0, as follows.

[Formula 4]

$$I_{n-1} = dI \cdot X \quad (4)$$
$$I_{n-2} = I_{n-1} e^{adYc} - dI \cdot X$$
$$\vdots$$
$$I_0 = I_1 e^{adYc} - dI \cdot X$$

Specifically, going back to an initial state where the luminous flux is input to the light guide body from a state where the luminous flux is guided n times by the unit distance dY in the light guide body and the remaining light intensity $I_n$ is exhausted, the calculation unit 3 calculates the input light intensity $I_0$ by adding the light intensity lost in each time, i.e., the absorption loss $I_{loss}$ and the light emission intensity dI·X to the intensity $I_n$(=0).

In a case where the critical even brightness is selected as the calculation item, the calculation unit 3 calculates the light guide distance dYn according to the equation (2) by using the setting value of the input light intensity $I_0$ and by using a goal seek, i.e., repeatedly changing a value of the even brightness L, and calculates the even brightness L from maximum dI·X (conditional equation: dI·X>$I_{n+1}$≥0) at a time when the calculation value becomes equal to the setting value of the light guide distance $Y_{max}$.

The determination unit 4 is configured to determine the maximum light guide distance, the required input luminous flux or the critical even brightness. In a case where the maximum light guide distance is selected as the calculation item, the determination unit 4 determines the calculation value of the light guide distance dYn calculated by the calculation unit 3, as the maximum light guide distance (i.e., the theoretical limitation of the light guide distance). In a case where the required input luminous flux is selected as the calculation item, the determination unit 4 determines the calculation value of the input light intensity $I_0$ calculated by the calculation unit 3, as the required input luminous flux (i.e., the theoretical limitation of the input luminous flux). In a case where the critical even brightness is selected as the calculation item, the determination unit 4 determines the calculation value of the even brightness L calculated by the calculation unit 3, as the critical even brightness (i.e., the theoretical limitation of the brightness). The results are transmitted to the output unit 5.

Note that, the determination unit 4 may also be configured to determine the absorption loss ($I_0$–dI·n) and the luminous efficiency (dI·n/$I_0$) of the luminous flux, based on the calculation results calculated by the calculation unit 3.

The output unit 5 is configured to output the maximum light guide distance, the required input luminous flux or the critical even brightness determined by the determination unit 4 onto the input/output screen 6. In a case where the maximum light guide distance is selected as the calculation item, the calculation value thereof is indicated in a field of the light guide distance, in a case where the required input luminous flux is selected, the calculation value thereof is indicated in a field of the input luminous flux, and in a case where the critical even brightness is selected, the calculation value thereof is indicated in a field of the even brightness, like the example shown in FIG. 3.

Figure 5:
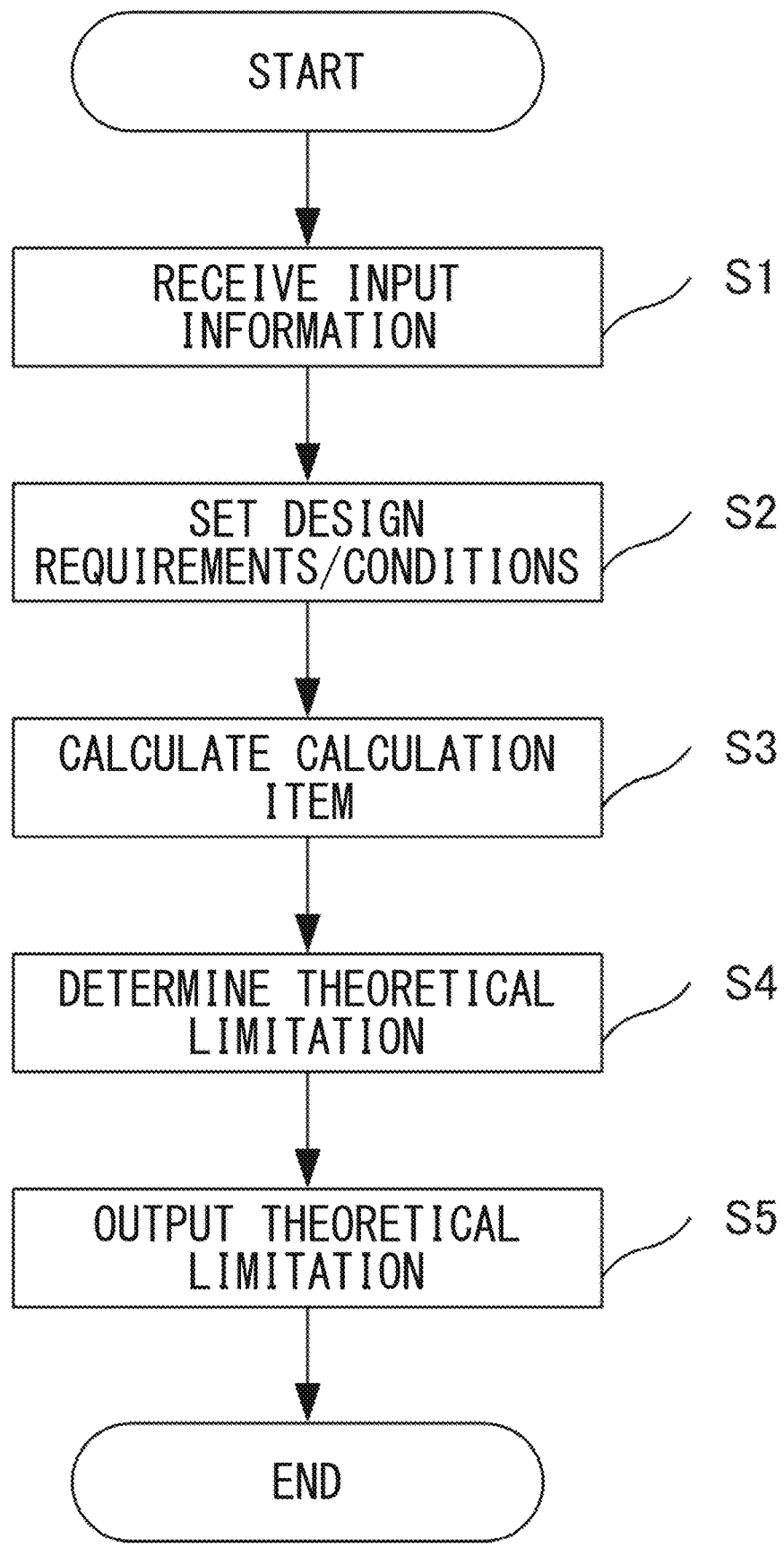
FIG. 5 shows a flow of a design support method according to the first embodiment.

FIG. 5 shows a flow of a design support method that is executed by the design support device 10 according to the first embodiment.

In step S1, the input information that is input by the user is received by the input unit 1. Here, as the input information, selection of the calculation item from the maximum light guide distance, the required input luminous flux and the critical even brightness, selection of a material of the light guide body or a value of the absorption coefficient of the material, a value of the light guide width, and values of two remaining items excluding an item corresponding to a selection item from the input luminous flux, the even brightness and the light guide distance. In the example shown in FIG. 3, the critical even brightness is selected as the calculation item, the acrylic resin is selected as the material of the light guide body, and the values of the light guide width, the input luminous flux and the light guide distance are input.

In step S2, the setting requirements and conditions for the light guide body are set by the setting unit 2. The setting unit 2 sets a value of the absorption coefficient a of the material of the light guide body, a value of the light guide width X, and values of two remaining items excluding the calculation item from the input light intensity $I_0$, the even brightness L and the light guide distance $Y_{max}$, according to the input information received in step S1. Here, when the maximum light guide distance is selected as the calculation item, each value of the input luminous flux and the even brightness is set, when the required input luminous flux is selected, each value of the light guide distance and the even brightness is set, and when the critical even brightness is selected, each value of the light guide distance and the input luminous flux is set. In the example shown in FIG. 3, a value of absorption coefficient determined from the selected acrylic resin, and a value of the light guide width, a value of the input luminous flux and a value of the light guide distance are set from the input information input by the user.

In step S3, the calculation unit 3 calculates an item corresponding to the calculation item among the light guide distance, the input luminous flux, and the even brightness by applying the setting values set by the setting unit 2 to the equation (1). In a case where the maximum light guide distance is selected as the calculation item, the calculation unit 3 calculates the light guide distance dYn by using the setting values of the input light intensity $I_0$ and the even brightness L. In a case where the required input luminous flux is selected as the calculation item, the calculation unit 3 calculates the light guide distance dYn by using the setting value of the even brightness L and by repeatedly changing the value of the input light intensity $I_0$, and calculates the input light intensity $I_0$ at which the calculation value becomes equal to the setting value of the light guide distance $Y_{max}$. In a case where the critical even brightness is selected as the calculation item, the calculation unit 3 calculates the light guide distance dYn by using the setting value of the input light intensity $I_0$ and by repeatedly changing the value of the even brightness L, and calculates the even brightness L at which the calculation value becomes equal to the setting value of the light guide distance $Y_{max}$. The method of calculating the light guide distance dYn is as described above.

In step S4, the maximum light guide distance, the required input luminous flux or the critical even brightness is determined by the determination unit 4. In a case where the maximum light guide distance is selected as the calculation item, the calculation value of the light guide distance dYn calculated in step S3 is determined as the maximum light guide distance (i.e., the theoretical limitation of the light guide distance). In a case where the required input luminous flux is selected as the calculation item, the calculation value of the input light intensity $I_0$ calculated in step S3 is determined as the required input luminous flux (i.e., the theoretical limitation of the input luminous flux). In a case where the critical even brightness is selected as the calculation item, the calculation value of the even brightness L calculated in step S3 is determined as the critical even brightness (i.e., the theoretical limitation of the brightness).

Note that, in step S4, the absorption loss ($I_0$–dI·n) and the luminous efficiency (dI·n/$I_0$) of the luminous flux may be further determined based on the calculation results in step S3.

In step S5, the maximum light guide distance, the required input luminous flux or the critical even brightness determined in step S4 is output onto the input/output screen 6 by the output unit 5. In a case where the maximum light guide distance is selected as the calculation item, the calculation value thereof is indicated in the field of the light guide distance, in a case where the required input luminous flux is selected, the calculation value thereof is indicated in the field of the input luminous flux, and in a case where the critical even brightness is selected, the calculation value thereof is indicated in the field of the even brightness, like the example shown in FIG. 3.

As described in detail above, according to the design support device 10 and the design support method of the first embodiment, by using the minimum phenomenological model taking into account only the most dominant absorption loss by the light guide body among the losses of luminous flux guided in the light guide body from the light incident surface to the light-emitting surface and ignoring the light entrance loss, the loss caused due to the strike through of the luminous flux and the loss caused due to the terminal surplus of the luminous flux, it is possible to obtain the theoretical limitations of the light guide distance of the light guide body, the input luminous flux into the light incident surface and the even brightness on the light-emitting surface.

Note that, in the design support device 10 and the design support method of the first embodiment, the brightness is calculated by solving the equation (1) indicating the balance of the luminous flux by using the goal seek. However, the equation (1) may also be solved using any optimization calculation method, instead of the goal seek.

Second Embodiment

In the design support device 10 and the design support method of the first embodiment, by using the minimum phenomenological model incorporating only the absorption loss, which is inevitable and most dominant, among the physical effects received by the light beam guided in the light guide body, the design requirements and conditions for the light guide body, particularly, the theoretical limitations of the light guide distance, the input luminous flux (an example of the input light amount) corresponding to the intensity of the light source and the even brightness corresponding to the required brightness (an example of the output light amount) are obtained to make a prospect for the design of the light guide body, based on the results. When the design prospect is made by the initial design based on the theoretical limitations of the light guide body design, a more detailed design of the light guide body is studied. Therefore, in a design support device 20 and a design support method according to a second embodiment, a prism design of designing a prism by calculating a light distribution and strike through of the luminous flux based on reflection and refraction of the luminous flux by the prism arranged in the light guide body, a cross section design of designing a cross-sectional shape of the light guide body by calculating an emission distribution and a reflection distribution of the luminous flux (an intensity distribution of the luminous flux with respect to an emission or reflection direction) based on reflection and refraction of the luminous flux on a surface of the light guide body, and a path design of designing a path of the luminous flux passing through an inside of the light guide body by calculating a leakage of the luminous flux due to bending of the light guide path (a central axis of the light guide body) and a light density concentrating in the light guide body due to widening of a cross section are further performed.

In the second embodiment, it is assumed that the following assumptions are adopted so as to perform the prism design, the cross section design, and the path design. 1) The prism is designed with considering the strike through so that the brightness on the light-emitting surface is even. 2) The leakage of the luminous flux from the terminal face, i.e., the terminal surplus is considered. That is, by using a more precise phenomenological model incorporating all of the light entrance loss, the absorption loss, the strike through and the terminal surplus, the design requirements for the prism, the cross section of the light guide body and the light guide path are derived in a case where the luminous flux input in the light guide body is absorbed by the light guide body, advances along the light guide path while being reflected and refracted on the prism and the surface of the light guide body and is output from the light-emitting surface, so that light is emitted from the light-emitting surface at even brightness.

The design support device 20 according to the second embodiment is constituted by a computer device such as a personal computer and has a functional configuration shown in FIG. 2, similar to the design support device 10 according to the first embodiment. Specifically, the design support device 20 comprises an input unit 1, a setting unit 2, a calculation unit 3, a determination unit 4, and an output unit 5.

The input unit 1 is configured to receive input information that is input via an input device such as a keyboard by a user. The input information is transmitted to the setting unit 2.

Figure 6:
FIG. 6 shows an input/output screen of a design support device according to a second embodiment.

FIG. 6 shows an input/output screen 7 of the design support device 20. The input information includes, for example, selection of at least one design item from the prism design, the cross section design and the path design, selection of a material of the light guide body or an absorption coefficient a and a refractive index n of the material, the input luminous flux F, and the even brightness L. As the material of the light guide body, acrylic resin and polycarbonate resin are indicated as the selection item. In the present example, the prism design is selected as the design item, acrylic resin is selected as the material of the light guide body, and values of the input luminous flux F and the even brightness L are input by the user.

The setting unit 2 is configured to set setting values with respect to a design item and a design condition of the light guide body. The design item includes at least one item selected from the prism design, the cross section design and the path design. Furthermore, the design item may include selection as to whether an accessory optical member is arranged around the light guide body. The design condition includes the absorption coefficient a and the refractive index n of the material of the light guide body, the input luminous flux F, and the even brightness L.

When the prism design is selected via the input unit 1, the setting unit 2 sets a design element of the prism design that is a design target. As the design element of the prism design, when a two-dimensional prism configured to scatter the luminous flux advancing in the light guide direction while being reflected in the thickness direction on the upper and bottom surfaces of the light guide body is selected, a shape of the reflective surface (for example, a triangle, a rectangle, a trapezoid and the like), a size (a height and a width as seen in the light guide direction), an inclination, an arrangement pitch with respect to the light guide direction, and the like are included. When a three-dimensional prism configured to scatter the luminous flux advancing in the light guide direction while being reflected in the thickness direction and in the width direction on the surfaces (the upper surface, the bottom surface and the side surface) of the light guide body in the light guide body is selected, a shape of the prism (for example, a three-sided pyramid, a four-sided pyramid, and the like), a size (a height, a width and a depth as seen in the light guide direction), an inclination of each reflective surface, an arrangement pitch with respect to the light guide direction, and the like are included. Note that, when the prism design is not selected, the setting unit 2 sets a setting value of the design element of the prism design given or initially set by the user.

When the cross section design is selected via the input unit 1, the setting unit 2 further sets a design element of the cross-sectional shape of the light guide body that is a design target. It is assumed that the light guide body includes a light guide part to which the luminous flux is guided, and a reflection part on which the prism is arranged, for example. The design element of the cross-sectional shape includes a cross-sectional shape (a shape as seen in the light guide direction; a circular shape, an elliptical shape, a rectangular shape, and the like) and a size (a radius, a thickness, a width and the like) of the light guide part, and a position (embedded in a bottom portion of the light guide part, erected on the bottom portion, and the like), a shape (a shape as seen in the light guide direction; a rectangular shape, a polygonal shape, and the like), and a size (a thickness, a width and the like) of the reflection part. Note that, when the cross section design is not selected, the setting unit 2 sets a setting value of the design element of the cross-sectional shape of the light guide body given or initially set by the user.

When the path design is selected via the input unit 1, the setting unit 2 further sets a design element of the path of the light guide body that is a design target. The design element of the path largely includes a bending and a gradual variation width of the path. As for the bending of the path, a bending direction and a curvature of the light guide path (for example, a central axis of the light guide body) are included. As for the gradual variation width, a degree of widening of a cross section in a direction (for example, the thickness direction and the width direction) orthogonal to the light guide direction is included. Note that, when the path design is not selected, the setting unit 2 sets a setting value of the design element of the path of the light guide body given or initially set by the user.

When arrangement of an accessory optical member is selected via the input unit 1, the setting unit 2 further sets a design element of the accessory optical member and a setting value thereof. The design element of the accessory optical member includes a type (for example, a reflection plate, a diffusion plate, a lens and the like) of an optical member to be arranged around the light guide body. Here, the reflection plate is an optical member configured to reflect the luminous flux penetrating and striking through the prism or bottom surface of the light guide body toward the light-emitting surface. The diffusion plate is an optical member configured to uniformly diffuse the luminous flux emitted from the light-emitting surface of the light guide body, thereby making a brightness distribution uniform. The lens is an optical member configured to collect the luminous flux emitted from the light-emitting surface of the light guide body. The setting value of the design element includes values such as a size, a reflectance and the like of the reflection plate, a size, a diffusivity and the like of the diffusion plate, and a size, a light collecting efficiency and the like of the lens.

The setting unit 2 is also configured to set design conditions, i.e., the absorption coefficient a and the refractive index n of the material of the light guide body, and the setting values of the input luminous flux F and the even brightness L, according to the input information transmitted from the input unit 1. Note that, as the values of the absorption coefficient and the refractive index, when a material of the light guide body is selected, values determined from the material are set. The values of the absorption coefficients and the refractive indexes determined from each of materials may also be stored in advance in a memory or the like. In addition, when the value is arbitrarily input, the input value is set.

The design items, design conditions and setting values thereof set by the setting unit 2 are transmitted to the calculation unit 3.

The calculation unit 3 applies the setting values of the design elements and the setting values of the design conditions set by the setting unit 2 to the calculation equation (1) and determines the design elements of the design target set by the setting unit 2 so as to obtain the even brightness L, thereby designing the light guide body with respect to the selected design item. Note that, by using the calculation equation (1), the calculation unit 3 calculates, regarding a plurality of sections n obtained by dividing an inside of the light guide body along a light guide path every unit distance dy, an absorption light amount $I_{loss}=I_{n-1}(1-e^{-adYc})$ to be absorbed by the light guide body and an output light amount dI·X to be output from the light-emitting surface at a time when the luminous flux passes through each of the sections n, and calculates an intensity $I_n$ at a time when the luminous flux goes out of each of the sections by subtracting the calculation values of the absorption light amount and the output light amount from an intensity $I_{n-1}$ before the luminous flux enters each of the sections.

Here, in order to calculate the output light amount dI·X, the calculation unit 3 calculates light distribution potentials $f_A$, $f_B$ and $f_C$ of the luminous flux that is transmitted in the light guide body, based on each of the design items.

The light distribution potential based on the prism design is calculated as a light distribution $f_A(\Omega_A, \Theta_A; \theta_A)$ of the luminous flux to be reflected and refracted by the prism (for example, an intensity distribution with respect to a light distribution angle $\theta_A$ as seen in the width direction) by applying a light incident distribution to the prism (for example, an intensity distribution of the luminous flux with respect to the light incident angle, which is denoted as $\Theta_A$) with respect to the design element (denoted as $\Omega_A$) described above. However, $\int d\theta_A f_A = 1$. Specifically, the light distribution potential $f_A$ indicates a scattering probability distribution of the luminous flux by the prism. In a case where the prism design is selected, the light distribution potential $f_A$ is calculated with respect to a variety of design elements $\Omega_A$ and a variety of light incident distributions $\Theta_A$, and in a case where the prism design is not selected, the light distribution potential $f_A$ is calculated with respect to the setting value given or initially set by the user.

Figure 7:
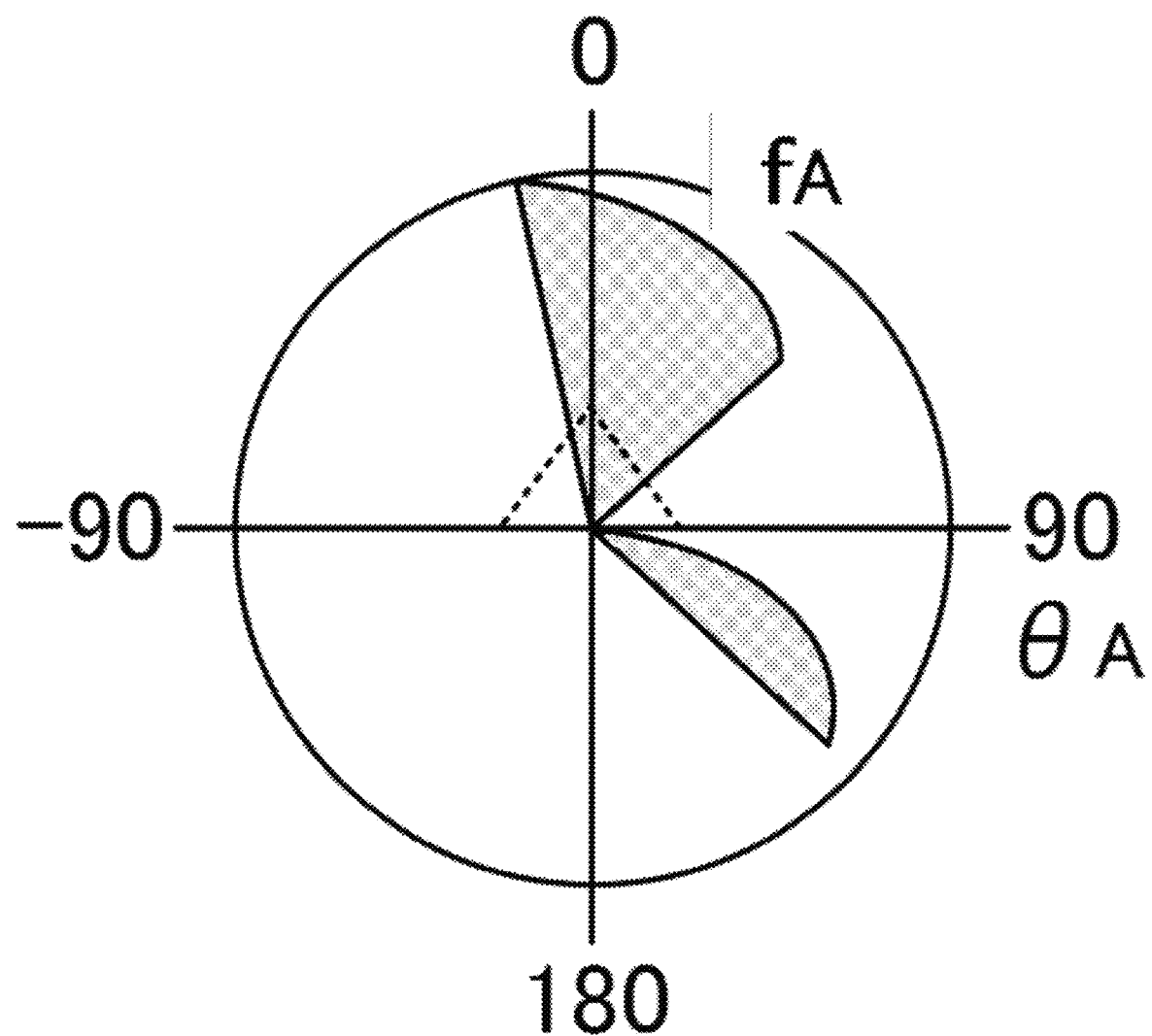
FIG. 7 shows an example of light distribution potentials based on a prism design.

FIG. 7 shows an example of the light distribution potential $f_A$ based on the prism design. In FIG. 7, the cross-sectional shape of the prism as seen in the width direction is shown with the broken line, and the light distribution potential $f_A$ is shown with the solid line with respect to the light distribution angle $\theta_A$ as seen in the width direction. Note that, −90°-side of the light distribution angle $\theta_A$ is the light incident surface-side, 90°-side is the terminal face-side, and a direction from −90°-side toward 90°-side is the light guide direction. In the present example, a two-dimensional groove-shaped prism having a triangular cross-section and straightly extending in the width direction is adopted. For the design element $\Omega_A$ of the prism, the shapes of the reflective surfaces on the front surface-side (light incident surface-side) and the back surface-side (terminal face-side) are rectangular, and the inclinations are 40° and −40° with respect to the thickness direction (i.e., a direction of zero degree). It is assumed that the light incident distribution $\Theta_A$ to the prism is uniform within a range from −42° to 42° with respect to the thickness direction. It can be seen that the light distribution potential $f_A$ distributes in an angle range from −10° to 50°, i.e., the luminous flux light-distributes in the angle range and also distributes in an angle range from 110° to 130°, specifically, the luminous flux strikes through via the prism in the angle range.

The light distribution potential based on the cross section design is calculated as a light distribution $f_B(\Omega_B, \Theta_B; \theta_B)$ of the luminous flux to be emitted from the surface of the light guide body (for example, an intensity distribution with respect to a light distribution angle $\theta_B$ in the cross section of the light guide body) by applying a light incident distribution of the luminous flux to the surface of the light guide body (for example, an intensity distribution with respect to the light incident position and angle on the surface of the light guide body, which is denoted as $\Theta_B$) with respect to the design element (denoted as $\Omega_B$) described above. However, $\int d\theta_B f_B = 1$, i.e., the light distribution potential $f_B$ indicates a scattering probability distribution of the luminous flux to be emitted from the light guide body in a direction parallel to the cross section thereof. In a case where the cross section design is selected, the light distribution potential $f_B$ is calculated with respect to a variety of design elements $\Omega_B$ and a variety of light incident distributions $\Theta_B$, and in a case where the cross section design is not selected, the light distribution potential $f_B$ is calculated with respect to the setting value given or initially set by the user.

Figure 8:
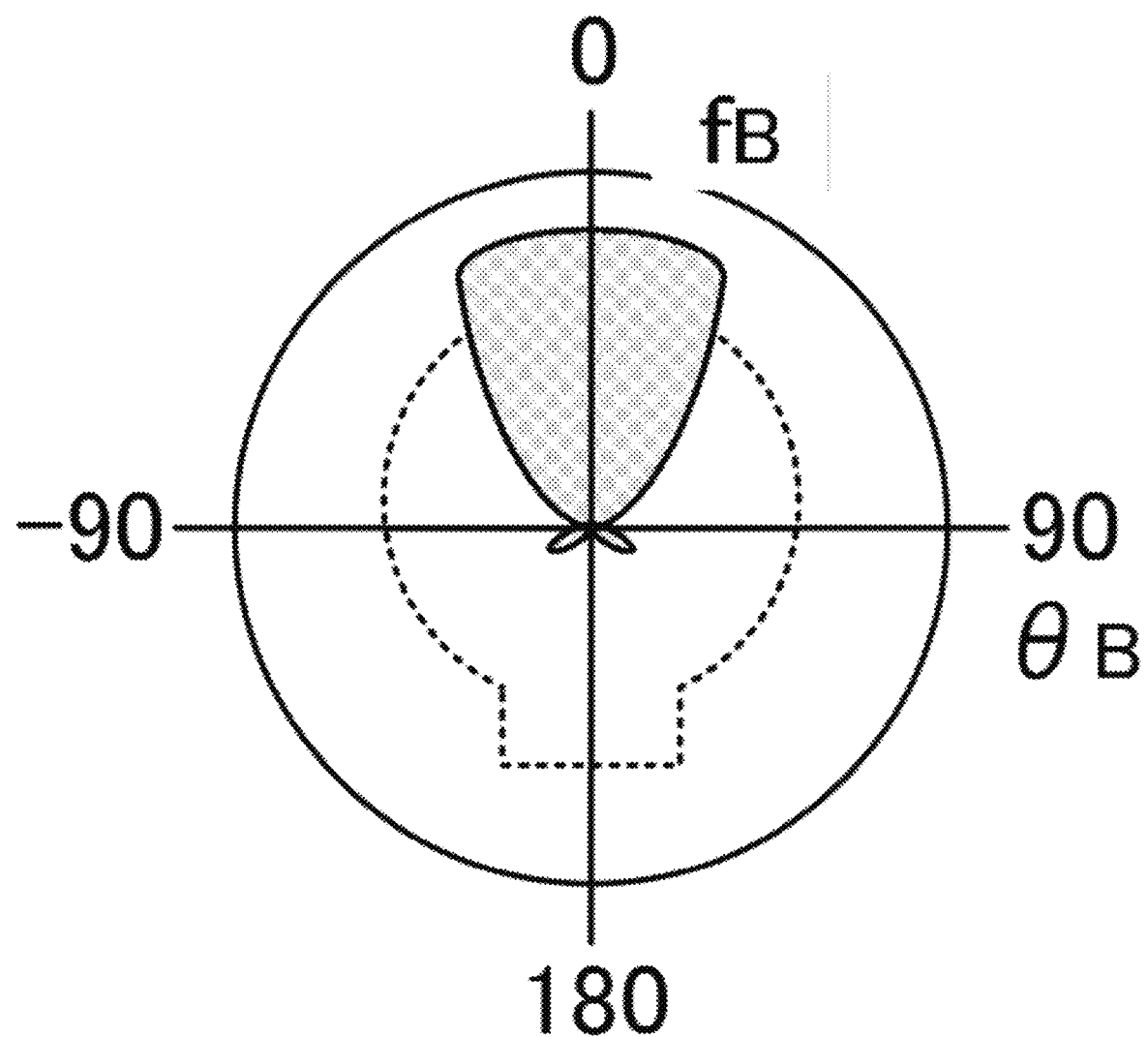
FIG. 8 shows an example of light distribution potentials based on a cross section design.

FIG. 8 shows an example of the light distribution potential $f_B$ based on the cross section design. In FIG. 8, the cross-sectional shape of the light guide body as seen in the light guide direction is shown with the broken line, and the light distribution potential $f_B$ is shown with the solid line with respect to the light distribution angle $\theta_B$ based on a center of the cross section of the light guide body. In the present example, for the design element $\Omega_B$ of the cross-sectional shape, the cross-sectional shape of the light guide part is a circular shape, the cross-sectional shape of the reflection part is a rectangular shape elongated in the width direction, and the reflection part is connected to the bottom portion of the light guide part with partially overlapping, so that the cross section of the light guide body has a keyhole shape as a whole. The light incident distribution $\Theta_B$ of the luminous flux to the surface of the light guide body is uniform over the entire angle range based on the center the cross section of the light guide body. It can be seen that the light distribution potential $f_B$ distributes in an angle range from $\theta_B = -30°$ to $30°$, i.e., the luminous flux is emitted from the upper surface-side of the light guide body and also a little distributes in an angle direction from $120°$ to $-120°$, specifically, the luminous flux is a little emitted from the side surface of the reflection part.

The light distribution potential based on the path design is calculated as an intensity distribution $f_C(\Omega_C, \Theta_C; x_C)$ of the luminous flux to be leaked from the surface of the light guide body (for example, a direction and an intensity distribution with respect to a position $x_C$ on an outer surface of the light guide body) by applying a light incident distribution of the luminous flux to the light incident surface and a light guide distribution of the luminous flux in the light guide body (for example, a direction and an intensity distribution of the luminous flux in the light guide body, which is denoted as $\Theta_C$) with respect to the design element (denoted as $\Omega_C$) described above. However, $\int dx_C f_C = 1$. That is, the light distribution potential $f_C$ indicates a leakage probability distribution of the luminous flux. In a case where the path design is selected, the light distribution potential $f_C$ is calculated with respect to a variety of design elements $\Omega_C$ and a variety of light guide distributions $\Theta_C$ of the luminous flux, and in a case where the path design is not selected, the light distribution potential k is calculated with respect to the setting value given or initially set by the user. Note that, the light distribution potential k is not limited to the intensity distribution of the leaked luminous flux, and may be calculated as a light density in the light guide body.

Figure 9:
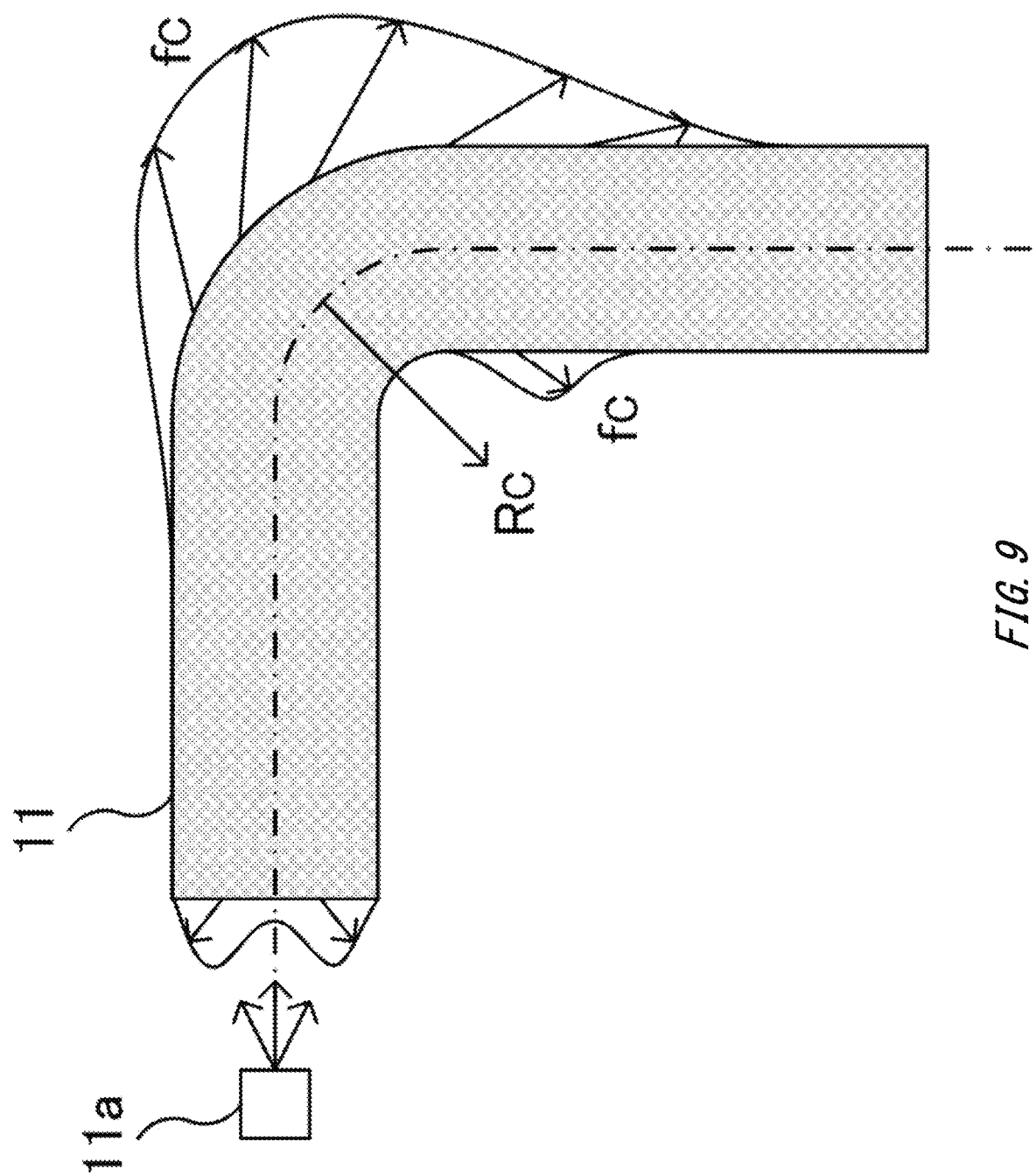
FIG. 9 shows an example of light distribution potentials based on a path design.

FIG. 9 shows an example of the light distribution potential k based on the path design. Here, a light guide body 11 bent in an L-shape as seen in the thickness direction is exemplified. In FIG. 9, the cross-sectional shape of the light guide body 11 as seen in the thickness direction is shown, the light distribution potential k indicates the direction and intensity of the luminous flux leaking from the light guide body 11 by directions and lengths of arrows each extending from the positions $x_C$ on the outer surface in the width direction. In addition, the intensity distribution of the light distribution potential k is shown from the envelope at tips of the arrows. In the present example, for the design element $\Omega_C$ of the path design, the central axis (shown with the dashed-dotted line) of the light guide body 11 is bent in the width direction by $90°$ with a curvature $R_C$, and the width is constant. As for the light incident distribution of the luminous flux to the light incident surface and the light guide distribution $\Theta_C$ of the luminous flux in the light guide body 11, it is assumed that the luminous flux isotropically enters the light incident surface on the upper left of FIG. 9 from a light source 11a and is guided rightward in FIG. 9 from the light incident surface with the uniform intensity distribution in the cross section. It can be seen that the light distribution potential $f_C$ distributes on the light incident surface, i.e., the light entrance loss is caused due to the reflection on the light incident surface, the light distribution potential $f_C$ distributes on the outer surface on the right of FIG. 9 from the bent part of the light guide body 11 to the terminal face, the luminous flux is leaked therefrom rightward in FIG. 9, the light distribution potential k distributes on an outer surface of a part from the left of the bent part of the light guide body 11 toward the terminal face, and the luminous flux is leaked therefrom in the left and lower direction of FIG. 9.

Figure 10:
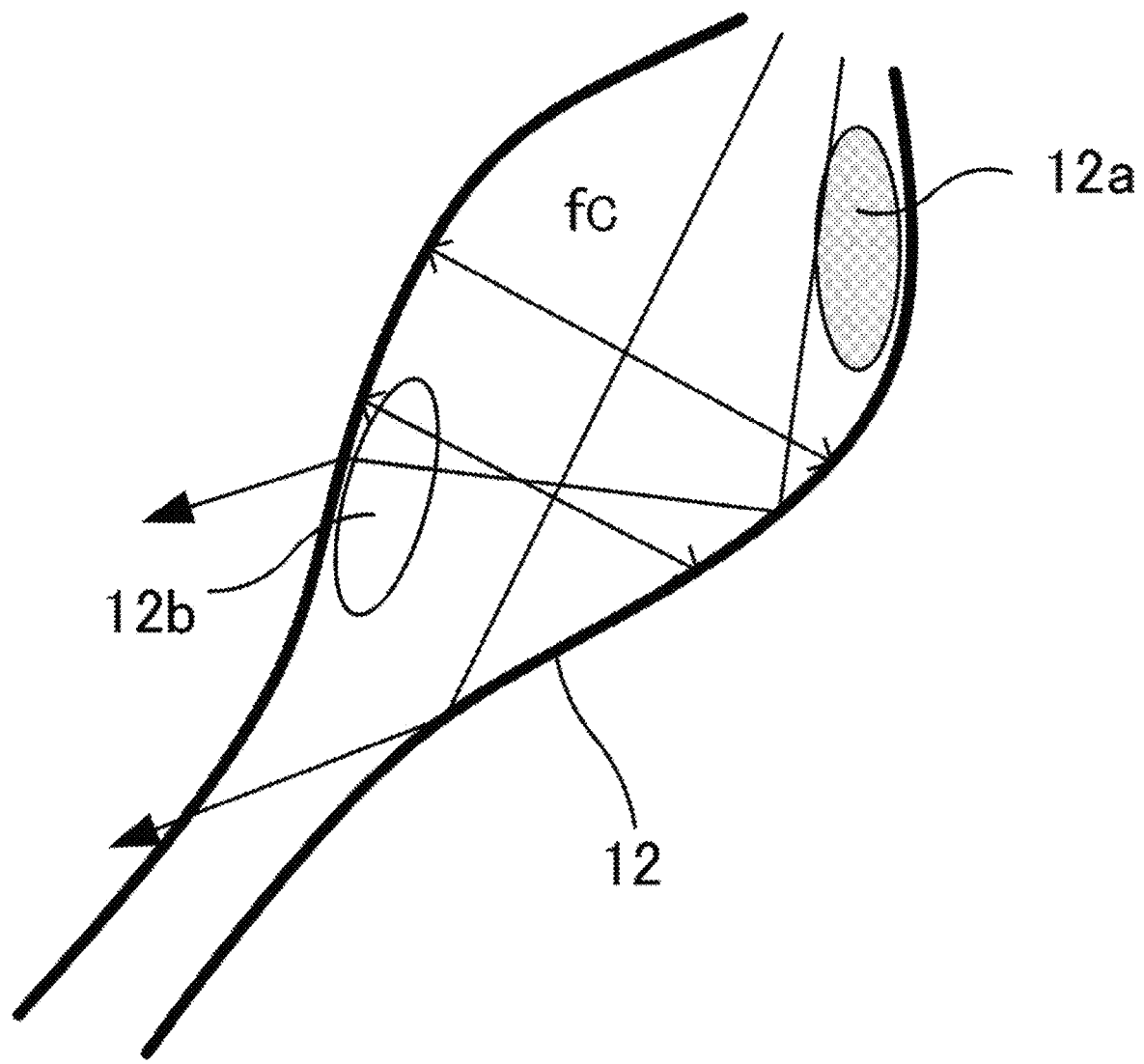
FIG. 10 shows another example of light distribution potentials based on the path design.

FIG. 10 shows another example of the light distribution potential $f_C$ based on the path design. In FIG. 10, a cross-sectional shape of a light guide body 12 as seen in the thickness direction is shown, and an area 12a in which the light density in the light guide body 12 derived based on the light distribution potential k is low and an area 12b in which the light density is high are shown. In the present example, for the design element $\Omega_C$ of the path design, it is assumed that a central axis (not shown) of the light guide body 12 is linear (i.e., there is no bending) and some areas are widened as shown. As for the light guide distribution $\Theta_C$ of the luminous flux in the light guide body 12, it is assumed that the luminous flux is guided from the light incident surface on the right upper side in FIG. 10 toward the left lower side in FIG. 10 with the uniform intensity distribution in the cross section. The light distribution potential k indicates that the light density is low in the widened area 12a on the right upper side in FIG. 10 and the light density is high in the narrowed area 12b on the left side in FIG. 10. From the result, it can be seen that the luminous flux is difficult to leak rightward in FIG. 10 from the area 12a of the light guide body 12 and is likely to leak leftward in FIG. 10 from the area 12b.

The calculation unit 3 solves the calculation equation (1), like the equation (2). In the first equation in the equation (2), the calculation unit 3 calculates the absorption loss $I_{loss}$ of the luminous flux absorbed by the light guide body and the light emission intensity $dI \cdot X$ output from the unit surface $dS (= dYX)$ on the light-emitting surface at a time when the luminous flux advances by the unit distance dY in the light guide body (i.e., the luminous flux advances through a first section in the light guide body), with respect to the input light intensity $I_0(=F/2\pi)$, and calculates the remaining light intensity $I_1$ by subtracting the calculation values thereof from the light intensity $I_0$. Note that, the unit surface dS is a unit surface on the light-emitting surface positioned in a target light-emitting direction from the central axis of the light guide body in the first section. Here, the absorption loss $I_{loss}$ of the luminous flux is calculated using the setting value of the absorption coefficient a. In addition, based on the diverse light distribution potentials $f_A(\Omega_A, \Theta_A; \theta_A)$, $f_B(\Omega_B, \Theta_B; \theta_B)$ and $f_C(\Omega_C, \Theta_C; x_C)$ calculated as described above, i.e., based on the design elements $\Omega_A$, $\Omega_B$ and $\Omega_C$ of the prism design, the cross section design and the path design and/or the setting values thereof, the output light amount $dI \cdot X = I_{n-1} f_A f_B f_C$ is calculated at a time when the luminous flux passes through the first section. The light distribution potentials $f_A$, $f_B$ and $f_C$ are selected so that the calculation value coincides with the index value of the output light amount $dI \cdot X$ determined using the setting value of the even brightness L and the setting value of the light guide width X. Specifically, the design elements $\Omega_A$, $\Omega_B$ and $\Omega_C$ and/or the setting values thereof, which give the light distribution potentials $f_A$, $f_B$ and $f_C$ at which the calculation value of the output light amount $dI \cdot X$ coincides with the index value, are selected.

In the second equation in the equation (2), the calculation unit 3 calculates the absorption loss $I_{loss}$ of the luminous flux and the light emission intensity $dI \cdot X$ at a time when the luminous flux further advances by the unit distance dY in the light guide body (that is, at a time when the luminous flux advances through the second section in the light guide body), with respect to the light intensity $I_1$ calculated in the first equation, and calculates the remaining light intensity $I_2$ by subtracting the calculation values thereof from the light intensity $I_1$. At this time, like the above, the design elements $\Omega_A$, $\Omega_B$ and $\Omega_C$ and/or the setting values thereof, which give the light distribution potentials $f_A$, $f_B$ and k at which the calculation value of the output light amount $dI \cdot X$ coincides with the index value, are selected.

The calculation unit 3 repeats the calculations until the remaining light intensity $I_n$ is exhausted (until the condition of $dI \cdot X > I_n \geq 0$ is satisfied in the numerical calculation) or until the luminous flux reaches the terminal of the light guide body. Specifically, the calculation unit 3 repeatedly calculates the absorption loss $I_{loss}$ of the luminous flux and the light emission intensity $dI \cdot X$ and calculates the remaining light intensity $I_n$ by subtracting the calculation values thereof from the light intensity $I_{n-1}$ each time the luminous flux advances by the unit distance dY in the light guide body (i.e., each time the luminous flux advances through each of the sections in the light guide body), with respect to the input light intensity $I_0$, until the remaining light intensity $I_n$ is exhausted or the luminous flux reaches the terminal of the light guide body. Here, based on the diverse light distribution potentials $f_A(\Omega_A, \Theta_A; \theta_A)$, $f_B(\Omega_B, \Theta_B; \theta_B)$ and $f_C(\Omega_C, \Theta_C; x_C)$, i.e., based on the design elements $\Omega_A$, $\Omega_B$ and $\Omega_C$ of the prism design, the cross section design and the path design and/or the setting values thereof, the output light amount $dI \cdot X = I_{n-1} f_A f_B f_C$ is calculated at a time when the luminous flux passes through each of the sections, and the design elements $\Omega_A$, $\Omega_B$ and $\Omega_C$ and/or the setting values thereof, which give the light distribution potentials $f_A$, $f_B$ and k at which the calculation value of the output light amount $dI \cdot X$ coincides with the index value, are selected. In this way, from the design elements $\Omega_A$, $\Omega_B$ and $\Omega_C$ and/or the setting values thereof selected in all the sections, the prism, the cross-sectional shape of the light guide body, and the path of the light guide body (the bending and gradual variation width of the path) are each designed.

Note that, in a case where any one of the prism design, the cross section design and the path design is not selected as the design item, the calculation unit 3 uses the light distribution potentials $f_{A0}(\Omega_{A0}, \Theta_A; \theta_A)$, $f_{B0}(\Omega_{B0}, \Theta_B; \theta_B)$ and $f_{C0}(\Omega_{C0}, \Theta_C; x_C)$ that are calculated by the design elements $\Omega_{A0}$, $\Omega_{B0}$ and $\Omega_{C0}$ and the setting values thereof given or initially set by the user, for the item not selected. By selecting the design elements $\Omega_A$, $\Omega_B$ and $\Omega_C$ and/or the setting values thereof, which give the light distribution potentials $f_A$, $f_B$ and $f_C$ at which the calculation value of the output light amount $dI \cdot X$ coincides with the index value, only for the item selected as the design item, the light guide body is designed for the selected design item.

Note that, in a case where the light distribution potentials $f_A$, $f_B$ and $f_C$ indicate the leakage from a surface other than he light-emitting surface, such as the strike through, at a time when the luminous flux passes through each of the sections, the calculation unit 3 calculates a leakage amount based on the light distribution potentials $f_A$, $f_B$ and $f_C$, and calculates the intensity $I_n$ at a time when the luminous flux goes out of each of the sections by subtracting the calculation value from the intensity $I_{n-1}$ at a time when the luminous flux enters each of the sections. Specifically, the leakage amount is subtracted on the right side of the calculation equation (1).

Note that, in a case where the accessory optical member is selected as being arranged, the calculation unit 3 calculates the output light amount at a time when the luminous flux passes through each of the sections, based on the design element of the optical member and the setting value thereof.

Figure 11:
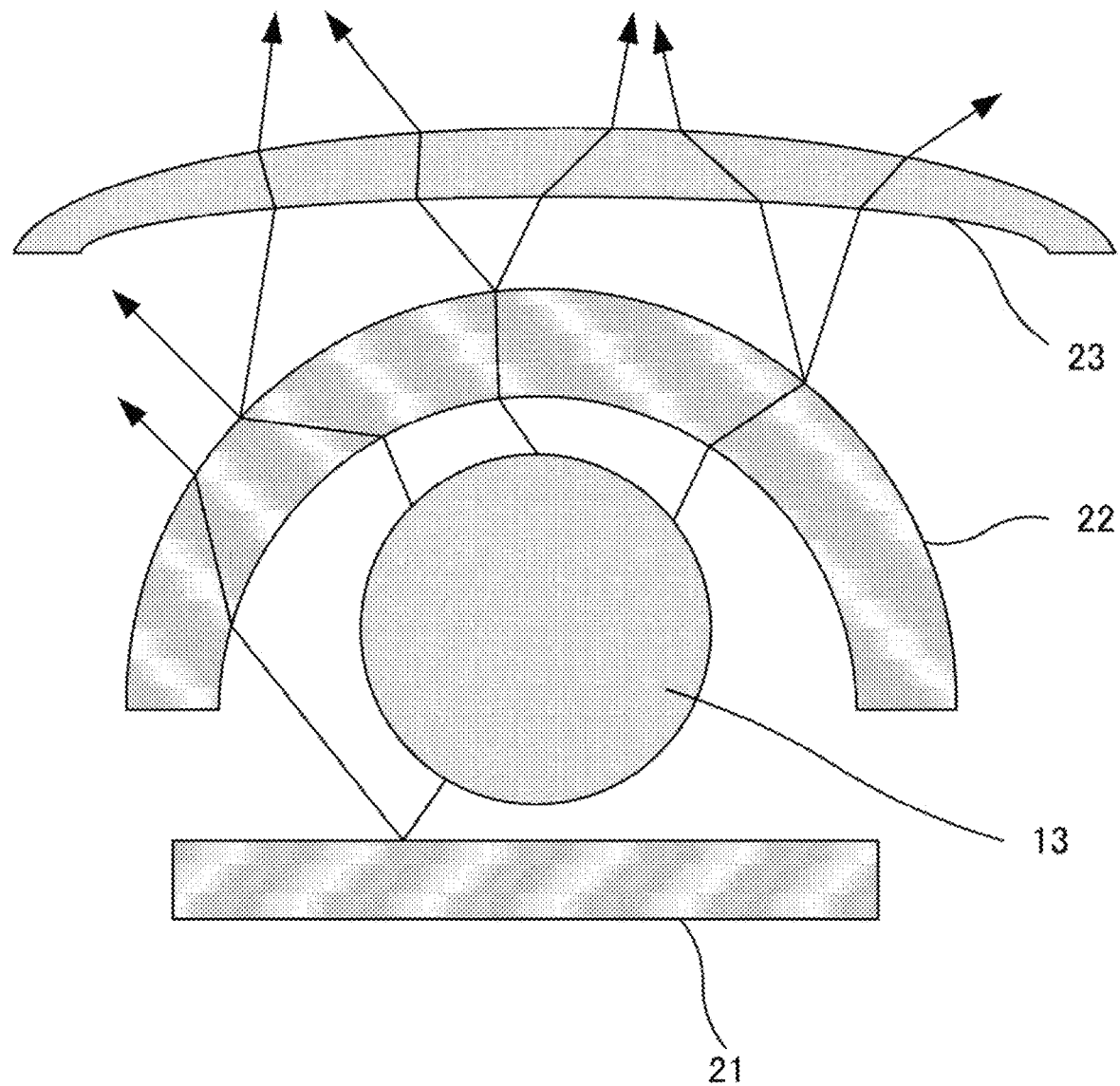
FIG. 11 shows an example of types and arrangement of accessory optical components.

FIG. 11 shows an example of types and arrangement of accessory optical components. The accessory optical components include a reflection plate 21, a diffusion plate 22, and a lens 23. The reflection plate 21 is arranged at the lower of a light guide body 13 with the reflective surface being directed upward in FIG. 11, and is configured to reflect the luminous flux penetrating and striking through a bottom surface of the light guide body 13 toward a light-emitting surface (upper surface). The diffusion plate 22 is arranged to cover the light-emitting surface (upper surface) of the light guide body 13, and is configured to uniformly diffuse the luminous flux emitted from the light-emitting surface of the light guide body 13 and to guide the luminous flux toward the upper in FIG. 11. The lens 23 is arranged above the diffusion plate 22, and is configured to collect the luminous flux emitted from the light-emitting surface of the light guide body 13 and passing through the diffusion plate 22. By combining the reflection plate 21, the diffusion plate 22, and the lens 23 with the light guide body 13, the brightness distribution can be made uniform.

The determination unit 4 is configured to determine a light emission amount to be output from the light-emitting surface of the light guide body based on the calculation values calculated by the calculation unit 3. Based on the result, the determination unit 4 may determine an entire average light intensity Ia and a central maximum light intensity Ian. Here, the entire average light intensity Ia is calculated as an average light intensity $(dIXY_{max})$ of the entire light-receiving surface by using a length of the light guide body in the light guide direction or a maximum distance $Y_{max}$ by which the luminous flux is guided in the light guide body. The central maximum light intensity Ian is a central light intensity of the light-receiving surface. The determination unit 4 may also be configured to further determine the absorption loss ($I_0$–dI·n) and the luminous efficiency (dI·n/$I_0$) of the luminous flux. The results are transmitted to the output unit 5.

The output unit 5 is configured to output the light emission amount and the like determined by the determination unit 4 onto the input/output screen 7. The output unit may also output the design results of the prism, the cross-sectional shape of the light guide body, and the path of the light guide body (the bending and gradual variation width of the path) selected as the design item.

Figure 12:
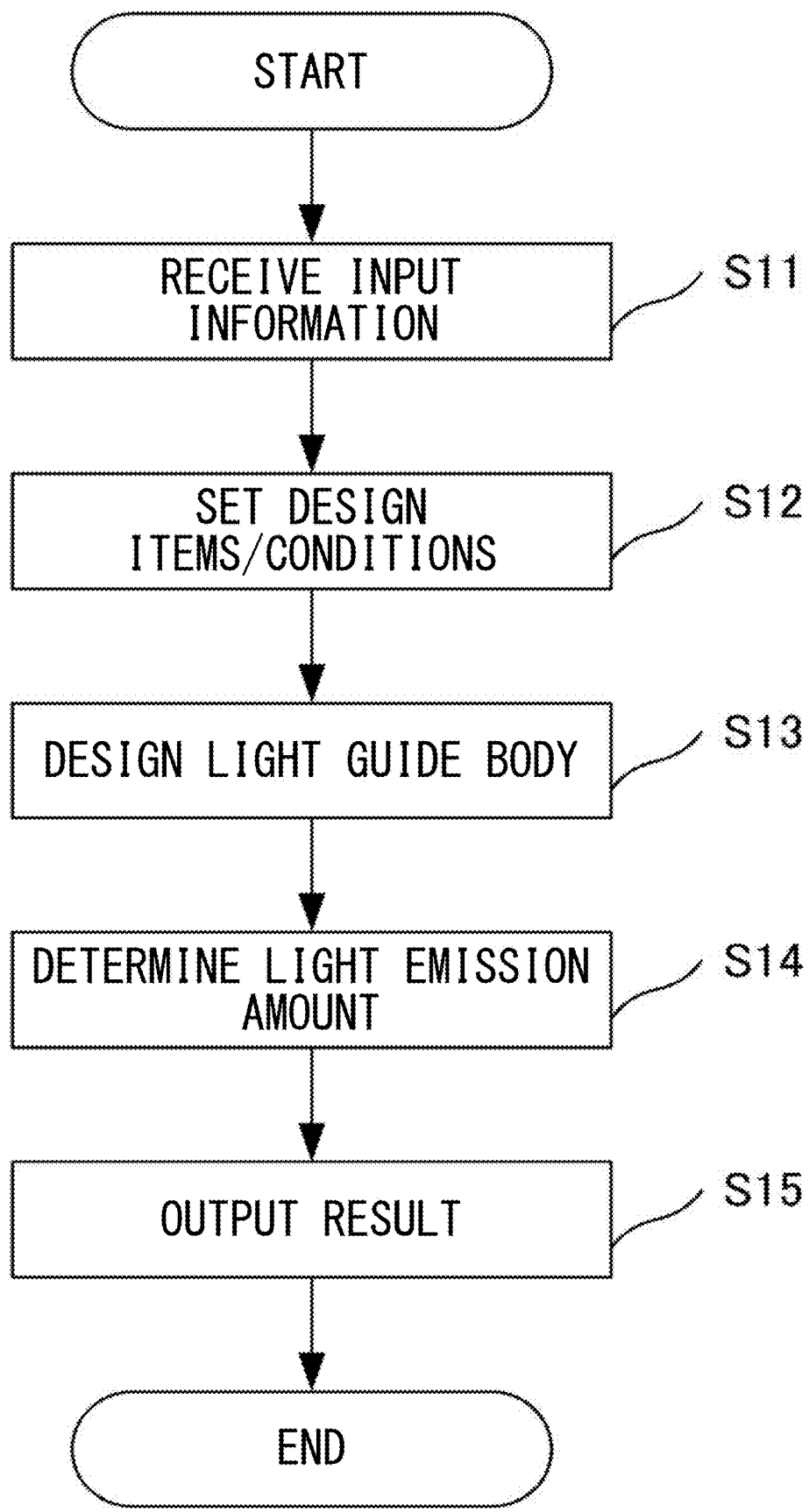
FIG. 12 shows a flow of a design support method according to the second embodiment.

FIG. 12 shows a flow of a design support method that is executed by the design support device 20 according to the second embodiment.

In step S11, the input information that is input by the user is received by the input unit 1. Here, the input information includes selection of at least one design item from the prism design, the cross section design and the path design, selection of a material of the light guide body or an absorption coefficient a and a refractive index n of the material, the input luminous flux F, and the even brightness L. In the example shown in FIG. 6, the prism design is selected as the design item, acrylic resin is selected as the material of the light guide body, and values of the input luminous flux F and the even brightness L are input by the user. Note that, for the design items not selected, in the present example, the cross section design and the path design, the design elements $\Omega_{A0}$, $\Omega_{B0}$ and $\Omega_{C0}$ and the values thereof that are separately input by the user may be received.

In step S12, the setting values with respect to the design item and the design condition of the light guide body are set by the setting unit 2. The design item includes at least one item selected from the prism design, the cross section design, and the path design. Furthermore, the design item may include selection as to whether an accessory optical member is arranged around the light guide body. The settings of the design elements and the setting values thereof in cases where each design item is selected and is not selected are as described above. The design condition includes the absorption coefficient a and the refractive index n of the material of the light guide body, the input luminous flux F, and the even brightness L. The setting unit 2 sets the setting values of the design conditions, according to the input information transmitted from the input unit 1.

In step S13, the calculation unit 3 applies the setting values of the design elements and the setting values of the design conditions set by the setting unit 2 to the calculation equation (1) and determines the design elements of the design target set by the setting unit 2 so as to obtain the even brightness L, thereby designing the light guide body with respect to the selected design item. Note that, by using the calculation equation (1), the calculation unit 3 calculates, regarding a plurality of sections n obtained by dividing an inside of the light guide body along a light guide path every unit distance dy, an absorption light amount $I_{loss} = I_{n-1}(1-e^{-adYc})$ to be absorbed by the light guide body and an output light amount dI·X to be output from the light-emitting surface at a time when the luminous flux passes through each of the sections n, and calculates an intensity $I_n$ at a time when the luminous flux goes out of each of the sections by subtracting the calculation values of the absorption light amount and the output light amount from an intensity $I_{n-1}$ before the luminous flux enters each of the sections.

Here, in order to calculate the output light amount dI·X, the calculation unit 3 calculates the diverse light distribution potentials $f_A(\Omega_A, \Theta_A; \theta_A)$, $f_B(\Omega_B, \Theta_B; \theta_B)$ and $f_C(\Omega_C, \Theta_C; x_C)$ of the luminous flux transmitted in the light guide body, based on each of the design items. Based on the design elements $\Omega_A$, $\Omega_B$ and $\Omega_C$ of the prism design, the cross section design and the path design and/or the setting values thereof, the calculation unit 3 calculates the output light amount dI·X=$I_{n-1}f_A f_B f_C$ at a time when the luminous flux passes through each of the sections, and selects the design elements $\Omega_A$, $\Omega_B$ and $\Omega_C$ and/or the setting values thereof, which give the light distribution potentials $f_A$, $f_B$ and k at which the calculation value of the output light amount dI·X coincides with the index value of the output light amount dI·X determined using the setting value of the even brightness L and the setting value of the light guide width X. In this way, from the design elements $\Omega_A$, $\Omega_B$ and $\Omega_C$ and/or the setting values thereof selected in all the sections, the prism, the cross-sectional shape of the light guide body, and the path of the light guide body (the bending and gradual variation width of the path) are each designed.

Note that, for the design item not selected, the calculation unit 3 uses the light distribution potentials $f_{A0}(\Omega_{A0}, \Theta_A; \theta_A)$, $f_{B0}(\Omega_{B0}, \Theta_B; \theta_B)$ and $f_{C0}(\Omega_{C0}, \Theta_C; x_C)$ that are calculated by the design elements $\Omega_{A0}$, $\Omega_{B0}$ and $\Omega_{C0}$ and the setting values thereof given or initially set by the user.

Note that, in a case where the light distribution potentials $f_A$, $f_B$ and k indicate the leakage from a surface other than the light-emitting surface, such as the strike through, at a time when the luminous flux passes through each of the sections, the calculation unit 3 calculates a leakage amount based on the light distribution potentials $f_A$, $f_B$ and $f_C$, and calculates the intensity $I_n$ at a time when the luminous flux goes out of each of the sections by subtracting the calculation value from the intensity $I_{n-1}$ at a time when the luminous flux enters each of the sections. Specifically, the leakage amount is subtracted on the right side of the calculation equation (1).

Note that, in a case where the accessory optical member is selected as being arranged, the calculation unit 3 calculates the output light amount at a time when the luminous flux passes through each of the sections, based on the design element of the optical member and the setting value thereof.

In step S14, the determination unit 4 determines a light emission amount to be output from the light-emitting surface of the light guide body, based on the calculation values calculated in step S13 by the calculation unit 3. Based on the result, the determination unit 4 may determine the entire average light intensity Ia and the central maximum light intensity Ian. The determination unit 4 may further determine the absorption loss ($I_0$–dI·n) and the luminous efficiency (dI·n/$I_0$) of the luminous flux.

In step S15, the output unit 5 outputs the light emission amount and the like determined in step S14 by the determination unit 4 onto the input/output screen 7. The output unit may also output the design results of the prism, the cross-sectional shape of the light guide body, and the path of the light guide body (the bending and gradual variation width of the path) selected as the design item.

As described in detail above, according to the design support device 20 and the design support method of the second embodiment, by using the more precise phenomenological model incorporating the losses of luminous flux guided in the light guide body from the light incident surface to the light-emitting surface, i.e., the losses of luminous flux caused due to the light entrance loss, the absorption loss, the strike through and the terminal surplus, it is possible to derive the design requirements for the prism, the cross section of the light guide body and the light guide path in a case where the luminous flux input in the light guide body is absorbed by the light guide body, advances along the light guide path while being reflected and refracted on the prism and the surface of the light guide body and is output from the light-emitting surface, so that light is emitted from the light-emitting surface at even brightness.

Note that, the design support devices 10 and 20 and the design support methods according to the first and second embodiments support the design of the light guide body configured to guide the luminous flux input from the light incident surface to the light-emitting surface different from the light incident surface and to output the luminous flux from the light-emitting surface but are not limited to the design of the light guide body configured to guide the luminous flux and may support a design of a propagating body configured to propagate heat (radiant heat), fluid and other waves or objects.

Note that, the design support devices 10 and 20 and the design support methods according to the first and second embodiments can be used to support the design of the light guide body but are not limited thereto and may also be used for computing of a simulation and the like that are not intended for a design.

Various embodiments of the present invention may be described with reference to flowcharts and block diagrams whose blocks may represent (1) steps of processes in which operations are performed or (2) sections of devices responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

Computer-readable media may include any tangible device that can store instructions for execution by a suitable device, such that the computer-readable medium having instructions stored therein comprises an article of manufacture including instructions which can be executed to create means for performing operations specified in the flowcharts or block diagrams. Examples of computer-readable media may include an electronic storage medium, a magnetic storage medium, an optical storage medium, an electromagnetic storage medium, a semiconductor storage medium, etc. More specific examples of computer-readable media may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY(registered trademark) disc, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA (registered trademark), C++, etc., and conventional procedural programming languages, such as the "C" programming language or similar programming languages.

Computer-readable instructions may be provided to a processor of a general purpose computer, special purpose computer, or other programmable data processing apparatus, or to programmable circuitry, locally or via a local area network (LAN), wide area network (WAN) such as the Internet, etc., to execute the computer-readable instructions to create means for performing operations specified in the flowcharts or block diagrams. Examples of processors include computer processors, processing units, microprocessors, digital signal processors, controllers, microcontrollers, etc.

Figure 13:
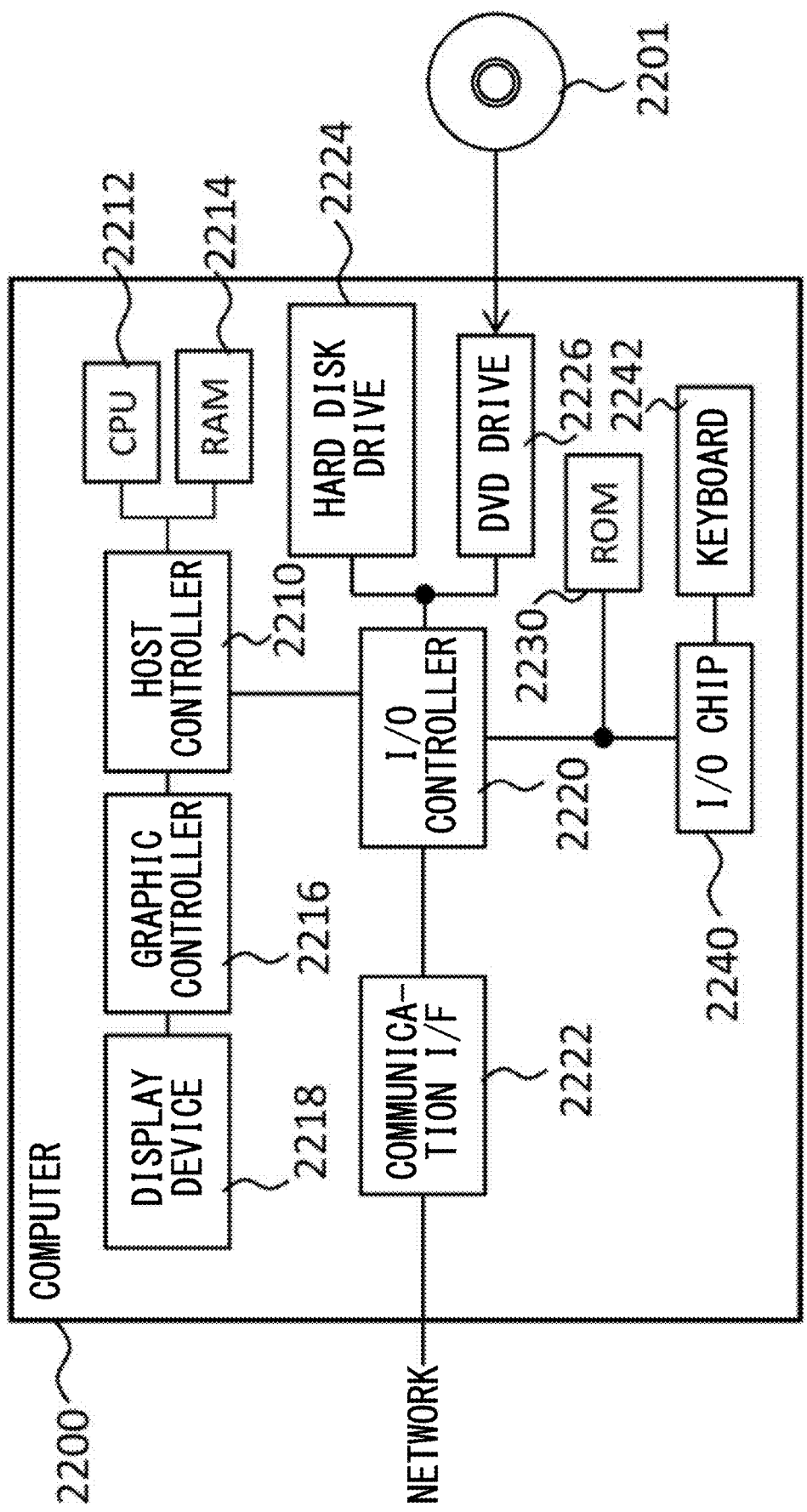
FIG. 13 shows an example of a configuration of a computer.

FIG. 13 shows an example of a computer 2200 in which a plurality of aspects of the present invention may be entirely or partially implemented. A program that is installed in the computer 2200 can cause the computer 2200 to function as or execute operations associated with the apparatus of the embodiment of the present invention or one or more sections thereof, and/or cause the computer 2200 to execute the method of the embodiment of the present invention or steps thereof. Such program may be executed by a CPU 2212 so as to cause the computer 2200 to execute certain operations associated with some or all of the blocks of flowcharts and block diagrams described herein.

The computer 2200 according to the present embodiment includes a CPU 2212, a RAM 2214, a graphic controller 2216 and a display device 2218, which are mutually connected by a host controller 2210. The computer 2200 also includes input/output units such as a communication interface 2222, a hard disk drive 2224, a DVD-ROM drive 2226 and an IC card drive, which are connected to the host controller 2210 via an input/output controller 2220. The computer 2200 also includes legacy input/output units such as a ROM 2230 and a keyboard 2242, which are connected to the input/output controller 2220 via an input/output chip 2240.

The CPU 2212 is configured to operate according to programs stored in the ROM 2230 and the RAM 2214, thereby controlling each unit. The graphic controller 2216 is configured to acquire image data generated by the CPU 2212 on a frame buffer or the like provided in the RAM 2214 or in itself, and to cause the image data to be displayed on the display device 2218.

The communication interface 2222 is configured to communicate with other electronic devices via a network. The hard disk drive 2224 is configured to store programs and data used by the CPU 2212 within the computer 2200. The DVD-ROM drive 2226 is configured to read the programs or the data from the DVD-ROM 2201, and to provide the hard disk drive 2224 with the programs or the data via the RAM 2214. The IC card drive is configured to read programs and data from an IC card, and/or to write programs and data into the IC card.

The ROM 2230 is configured to store therein a boot program or the like that is executed by the computer 2200 at the time of activation, and/or a program depending on the hardware of the computer 2200. The input/output chip 2240 may also be configured to connect various input/output units to the input/output controller 2220 via a parallel port, a serial port, a keyboard port, a mouse port and the like.

A program is provided by a computer-readable medium such as the DVD-ROM 2201 or the IC card. The program is read from the computer-readable medium, is installed into the hard disk drive 2224, the RAM 2214 or the ROM 2230, which are also examples of the computer-readable medium, and is executed by the CPU 2212. The information processing described in these programs is read into the computer 2200, resulting in cooperation between a program and the above-mentioned various types of hardware resources. A device or method may be constituted by realizing the operation or processing of information in accordance with the usage of the computer 2200.

For example, when communication is performed between the computer 2200 and an external device, the CPU 2212 may execute a communication program loaded onto the RAM 2214 to instruct communication processing to the communication interface 2222, based on the processing described in the communication program. The communication interface 2222, under control of the CPU 2212, reads transmission data stored on a transmission buffer processing region provided in a recording medium such as the RAM 2214, the hard disk drive 2224, the DVD-ROM 2201, or the IC card, and transmits the read transmission data to a network or writes reception data received from a network to a reception buffer processing region or the like provided on the recording medium.

In addition, the CPU 2212 may be configured to cause all or a necessary portion of a file or a database, which has been stored in an external recording medium such as the hard disk drive 2224, the DVD-ROM drive 2226 (DVD-ROM 2201), the IC card and the like, to be read into the RAM 2214, thereby executing various types of processing on the data on the RAM 2214. The CPU 2212 is configured to write back the processed data to the external recording medium.

Various types of information, such as various types of programs, data, tables, and databases, may be stored in the recording medium to undergo information processing. The CPU 2212 may also be configured to execute various types of processing on the data read from the RAM 2214, which includes various types of operations, processing of information, condition judging, conditional branching, unconditional branching, search/replacement of information and the like described in the present disclosure and designated by an instruction sequence of programs, and to write the result back to the RAM 2214. The CPU 2212 may also be configured to search for information in a file, a database, etc., in the recording medium. For example, when a plurality of entries, each having an attribute value of a first attribute associated with an attribute value of a second attribute, is stored in the recording medium, the CPU 2212 may search for an entry matching the condition whose attribute value of the first attribute is designated, from the plurality of entries, and read the attribute value of the second attribute stored in the entry, thereby obtaining the attribute value of the second attribute associated with the first attribute satisfying the predetermined condition.

The above-described program or software modules may be stored in the computer-readable medium on or near the computer 2200. In addition, a recording medium such as a hard disk or a RAM provided in a server system connected to a dedicated communication network or the Internet can be used as the computer-readable medium, thereby providing the programs to the computer 2200 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. An arithmetic apparatus configured to perform a design computing for a light guide body configured to guide light input from a light incident surface to a light-emitting surface different from the light incident surface and to output the light from the light-emitting surface by incorporating physical effects of light, the arithmetic apparatus comprising:
    a setting unit configured to set two setting values with respect to two among a light guide distance of the light guide body, an input light amount to the light incident surface and an output light amount on the light-emitting surface based on design requirements and conditions, the light guide distance being a distance that the light input to the light guide body reaches; and
    a calculation unit configured to calculate a calculation value about remaining one among the light guide distance, the input light amount and the output light amount by applying the two setting values set by the setting unit to a calculation equation indicative of a balance of light amounts compared before and after the light is guided by a unit distance in the light guide body that include the physical effects to meet the design requirements and conditions, wherein
    the two setting values set by the setting unit are a setting value of the light guide distance and a setting value of the input light amount, and
    the calculation unit is configured to calculate the calculation value of the output light amount to be a maximum output light amount, so that a new value of the light guide distance, which is calculated by using the setting value of the input light amount and by repeatedly changing a value of the output light amount, is to be equal to the setting value of the light guide distance.

2. The arithmetic apparatus according to claim 1, wherein the calculation unit is configured to calculate the calculation value of the output light amount by repeatedly calculating an absorption light amount to be absorbed by the light guide body and a light amount to be output from a unit surface on the light-emitting surface corresponding to the unit distance using the calculation equation and calculating a remaining intensity value by subtracting calculation values of the absorption light amount and the light amount from an intensity value of the light each time the light advances by the unit distance in the light guide body, until the remaining intensity value is exhausted.

3. The arithmetic apparatus according to claim 2, wherein the setting unit is configured to further set an absorption coefficient of the light guide body, and
    the calculation unit is configured to calculate the absorption light amount of the light to be absorbed by the light guide body by using the absorption coefficient.

4. The arithmetic apparatus according to claim 3, wherein the calculation unit is configured to calculate the absorption light amount of the light, further based on spread of the light advancing in the light guide body.

5. The arithmetic apparatus according to claim 1, wherein the arithmetic apparatus is configured to further determine at least one of an absorption loss and a luminous efficiency of the light.

6. An arithmetic apparatus configured to perform a design computing for a light guide body configured to guide light input from a light incident surface to a light-emitting surface different from the light incident surface and to output the light from the light-emitting surface by incorporating physical effects of light, the arithmetic apparatus comprising:
  a setting unit configured to set two setting values with respect to two among a light guide distance of the light guide body, an input light amount to the light incident surface and an output light amount on the light-emitting surface based on design requirements and conditions, the light guide distance being a distance that the light input to the light guide body reaches; and
  a calculation unit configured to calculate a calculation value about remaining one among the light guide distance, the input light amount and the output light amount by applying the two setting values set by the setting unit to a calculation equation indicative of a balance of light amounts compared before and after the light is guided by a unit distance in the light guide body that include the physical effects to meet the design requirements and conditions, wherein
  the two setting values set by the setting unit are a setting value of the input light amount and a setting value of the output light amount, and
  the calculation unit is configured to calculate the calculation value of the light guide distance to be a maximum light guide distance by using the setting value of the input light amount and the setting value of the output light amount.

7. The arithmetic apparatus according to claim 6, wherein
  the calculation unit is configured to calculate the calculation value of the light guide distance by repeatedly calculating an absorption light amount to be absorbed by the light guide body and a light amount to be output from a unit surface on the light-emitting surface corresponding to the unit distance using the calculation equation and calculating a remaining intensity value by subtracting calculation values of the absorption light amount and the light amount from an intensity value of the light each time the light advances by the unit distance in the light guide body, until the remaining intensity value is exhausted.

8. The arithmetic apparatus according to claim 7, wherein
  the calculation unit is configured to calculate the light amount to be output from the unit surface on the light-emitting surface, based on the setting value of the output light amount.

9. The arithmetic apparatus according to claim 8, wherein
  the setting unit is configured to further set a width of the light guide body, and
  the calculation unit is configured to calculate the light amount by using a setting value of the width.

10. The arithmetic apparatus according to claim 6, wherein the arithmetic apparatus is configured to further determine at least one of an absorption loss and a luminous efficiency of the light.

11. An arithmetic apparatus configured to perform a design computing for a light guide body configured to guide light input from a light incident surface to a light-emitting surface different from the light incident surface and to output the light from the light-emitting surface by incorporating physical effects of light, the arithmetic apparatus comprising:
  a setting unit configured to set two setting values with respect to two among a light guide distance of the light guide body, an input light amount to the light incident surface and an output light amount on the light-emitting surface based on design requirements and conditions, the light guide distance being a distance that the light input to the light guide body reaches; and
  a calculation unit configured to calculate a calculation value about remaining one among the light guide distance, the input light amount and the output light amount by applying the two setting values set by the setting unit to a calculation equation indicative of a balance of light amounts compared before and after the light is guided by a unit distance in the light guide body that include the physical effects to meet the design requirements and conditions, wherein
  the two setting values set by the setting unit are a setting value of the light guide distance and a setting value of the output light amount, and
  the calculation unit is configured to calculate the calculation value of the input light amount to be a required input light amount by using the setting value of the light guide distance and the setting value of the output light amount.

12. The arithmetic apparatus according to claim 11, wherein
  the calculation unit is configured to calculate the calculation value of the input light amount by repeatedly calculating an absorption light amount to be absorbed by the light guide body and a light amount to be output from a unit surface on the light-emitting surface corresponding to the unit distance using the calculation equation and calculating a remaining intensity value by subtracting calculation values of the absorption light amount and the light amount from an intensity value of the light each time the light advances by the unit distance in the light guide body, until the remaining intensity value is exhausted.

13. The arithmetic apparatus according to claim 12, wherein
  the calculation unit is configured to calculate the light amount to be output from the unit surface on the light-emitting surface, based on the setting value of the output light amount.

14. An arithmetic method of performing a design computing for a light guide body configured to guide light input from a light incident surface to a light-emitting surface different from the light incident surface and to output the light from the light-emitting surface by incorporating physical effects of light, the arithmetic method comprising:
  setting two setting values with respect to two among a light guide distance of the light guide body, an input light amount to the light incident surface and an output light amount on the light-emitting surface based on design requirements and conditions, the light guide distance being a distance that the light input to the light guide body reaches; and
  calculating a calculation value about remaining one among the light guide distance, the input light amount and the output light amount by applying the two setting values set in the setting to a calculation equation indicative of a balance of light amounts compared before and after the light is guided by a unit distance in the light guide body that include the physical effects to meet the design requirements and conditions, wherein
  the two setting values set in the setting are a setting value of the light guide distance and a setting value of the input light amount, and
  in the calculating, calculating the calculation value of the output light amount to be a maximum output light amount, so that a new value of the light guide distance, which is calculated by using the setting value of the input light amount and by repeatedly changing a value of the output light amount, is to be equal to the setting value of the light guide distance.

15. A non-transitory computer-readable storage medium having stored thereon a program for causing a computer to execute a design computing for a light guide body configured to guide light input from a light incident surface to a light-emitting surface different from the light incident surface and to output the light from the light-emitting surface by incorporating physical effects of light, the program including:

setting two setting values with respect to two among a light guide distance of the light guide body, an input light amount to the light incident surface and an output light amount on the light-emitting surface based on design requirements and conditions, the light guide distance being a distance that the light input to the light guide body reaches; and calculating a calculation value about remaining one among the light guide distance, the input light amount and the output light amount by applying the two setting values set in the setting to a calculation equation indicative of a balance of light amounts compared before and after the light is guided by a unit distance in the light guide body that include the physical effects to meet the design requirements and conditions, wherein the two setting values set in the setting are a setting value of the light guide distance and a setting value of the input light amount, and in the calculating, calculating the calculation value of the output light amount to be a maximum output light amount, so that a new value of the light guide distance, which is calculated by using the setting value of the input light amount and by repeatedly changing a value of the output light amount, is to be equal to the setting value of the light guide distance.

16. An arithmetic method of performing a design computing for a light guide body configured to guide light input from a light incident surface to a light-emitting surface different from the light incident surface and to output the light from the light-emitting surface by incorporating physical effects of light, the arithmetic method comprising:

setting two setting values with respect to two among a light guide distance of the light guide body, an input light amount to the light incident surface and an output light amount on the light-emitting surface based on design requirements and conditions, the light guide distance being a distance that the light input to the light guide body reaches; and calculating a calculation value about remaining one among the light guide distance, the input light amount and the output light amount by applying the two setting values set in the setting to a calculation equation indicative of a balance of light amounts compared before and after the light is guided by a unit distance in the light guide body that include the physical effects to meet the design requirements and conditions, wherein the two setting values set in the setting are a setting value of the input light amount and a setting value of the output light amount, and in the calculating, calculating the calculation value of the light guide distance to be a maximum light guide distance by using the setting value of the input light amount and the setting value of the output light amount.

17. An arithmetic method of performing a design computing for a light guide body configured to guide light input from a light incident surface to a light-emitting surface different from the light incident surface and to output the light from the light-emitting surface by incorporating physical effects of light, the arithmetic method comprising:

setting two setting values with respect to two among a light guide distance of the light guide body, an input light amount to the light incident surface and an output light amount on the light-emitting surface based on design requirements and conditions, the light guide distance being a distance that the light input to the light guide body reaches; and calculating a calculation value about remaining one among the light guide distance, the input light amount and the output light amount by applying the two setting values set in the setting to a calculation equation indicative of a balance of light amounts compared before and after the light is guided by a unit distance in the light guide body that include the physical effects to meet the design requirements and conditions, wherein the two setting values set in the setting are a setting value of the light guide distance and a setting value of the output light amount, and in the calculating, calculating the calculation value of the input light amount to be a required input light amount by using the setting value of the light guide distance and the setting value of the output light amount.

18. A non-transitory computer-readable storage medium having stored thereon a program for causing a computer to execute a design computing for a light guide body configured to guide light input from a light incident surface to a light-emitting surface different from the light incident surface and to output the light from the light-emitting surface by incorporating physical effects of light, the program including:

setting two setting values with respect to two among a light guide distance of the light guide body, an input light amount to the light incident surface and an output light amount on the light-emitting surface based on design requirements and conditions, the light guide distance being a distance that the light input to the light guide body reaches; and calculating a calculation value about remaining one among the light guide distance, the input light amount and the output light amount by applying the two setting values set in the setting to a calculation equation indicative of a balance of light amounts compared before and after the light is guided by a unit distance in the light guide body that include the physical effects to meet the design requirements and conditions, wherein the two setting values set in the setting are a setting value of the input light amount and a setting value of the output light amount, and in the calculating, calculating the calculation value of the light guide distance to be a maximum light guide distance by using the setting value of the input light amount and the setting value of the output light amount.

19. A non-transitory computer-readable storage medium having stored thereon a program for causing a computer to execute a design computing for a light guide body configured to guide light input from a light incident surface to a light-emitting surface different from the light incident surface and to output the light from the light-emitting surface by incorporating physical effects of light, the program including:

setting two setting values with respect to two among a light guide distance of the light guide body, an input light amount to the light incident surface and an output light amount on the light-emitting surface based on design requirements and conditions, the light guide distance being a distance that the light input to the light guide body reaches; and calculating a calculation value about remaining one among the light guide distance, the input light amount and the output light amount by applying the two setting values set in the setting to a calculation equation indicative of a balance of light amounts compared before and after the light is guided by a unit distance in the light guide body that include the physical effects to meet the design requirements and conditions, wherein the two setting values set in the setting are a setting value of the light guide distance and a setting value of the output light amount, and in the calculating, calculating the calculation value of the input light amount to be a required input light amount by using the setting value of the light guide distance and the setting value of the output light amount.

\* \* \* \* \*